US 6,594,545 B1
United States Patent
Kakigi

(10) Patent No.: US 6,594,545 B1
(45) Date of Patent: Jul. 15, 2003

(54) DATA PROCESSING APPARATUS, IMAGE RECORDING APPARATUS, METHOD OF CONTROLLING DATA PROCESSING APPARATUS, METHOD OF CONTROLLING IMAGE RECORDING APPARATUS AND STORAGE MEDIUM

(75) Inventor: Nobuyoshi Kakigi, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/662,133

(22) Filed: Sep. 14, 2000

(30) Foreign Application Priority Data

Sep. 17, 1999 (JP) ............................. 11-264645

(51) Int. Cl.$^7$ .............................................. G03G 15/00
(52) U.S. Cl. ....................... 700/223; 700/224; 700/225; 271/248
(58) Field of Search ................................ 271/278, 279, 271/298; 270/58.01, 58.18, 58.19; 700/223, 224, 225, 228

(56) References Cited

U.S. PATENT DOCUMENTS

| | | | | | |
|---|---|---|---|---|---|
| 3,871,643 A | * | 3/1975 | Kukucka et al. | ............. | 271/290 |
| 4,134,581 A | * | 1/1979 | Johnson et al. | ............. | 271/288 |
| 4,522,486 A | * | 6/1985 | Clark et al. | .................. | 271/288 |
| 5,096,184 A | * | 3/1992 | Maekawa et al. | ........... | 271/184 |
| 5,328,169 A | * | 7/1994 | Mandel | ...................... | 209/534 |
| 5,358,238 A | * | 10/1994 | Mandel et al. | .................. | 101/2 |
| 5,547,178 A | * | 8/1996 | Costello | .................. | 270/52.02 |
| 5,551,686 A | * | 9/1996 | Sanchez et al. | ........... | 270/58.18 |
| 5,599,009 A | * | 2/1997 | Mandel et al. | ........... | 270/58.09 |
| 5,609,333 A | * | 3/1997 | Mandel et al. | ........... | 270/58.09 |
| 5,823,529 A | * | 10/1998 | Mandel et al. | ............. | 271/176 |
| 5,898,592 A | * | 4/1999 | Salgado et al. | ............. | 271/298 |

FOREIGN PATENT DOCUMENTS

JP 2-120068 5/1990

* cited by examiner

Primary Examiner—Christopher P. Ellis
Assistant Examiner—Patrick Mackey
(74) Attorney, Agent, or Firm—Fitzpatrick, Cella, Harper & Scinto

(57) ABSTRACT

An image forming apparatus is connectable to a sheet processing apparatus having a plurality of stacking units for stacking recording sheets and capable of discharging recording sheets selectively to the plurality of stacking units. The image forming apparatus includes a controller for controlling a discharge operation of remaining recording sheets of a first job if a job stacking unit, stacking the recording sheets of the first job, becomes nonusable by the recording sheets of the first job during the discharge operation. The controller permits the discharge operation of the remaining recording sheets to an adjacent stacking unit, which is adjacent to the nonusable job stacking unit, even if the recording sheets have already begun stacking in another stacking unit of the plurality of stacking units, which is different from both of the nonusable job stacking unit and the adjacent stacking unit, when the adjacent stacking unit is not usable by other recording sheets, which are different from the recording sheets of the first job. The controller inhibits the discharge operation of the remaining recording sheets even if the recording sheets have not been stacked in the another stacking unit when the adjacent stacking unit is nonusable by the other recording sheets.

24 Claims, 29 Drawing Sheets

FIG. 12

VC ··· VIDEO CONTROLLER
EC ··· ENGINE CONTROLLER

| SIGNAL NAME | DIRECTION | CONTENTS |
| --- | --- | --- |
| /CPRDY | VC→EC | SIGNAL REPRESENTING THAT VIDEO CONTROLLER 103 IS IN STATE CAPABLE OF COMMUNICATING WITH ENGINE CONTROLLER 105 |
| /PPRDY | VC←EC | SIGNAL REPRESENTING THAT ENGINE CONTROLLER 105 IS IN STANDBY STATE CAPABLE OF COMMUNICATING WITH VIDEO CONTROLLER 103 |
| /RDY | VC→EC | SIGNAL REPRESENTING THAT ENGINE CONTROLLER 105 IS IN STANDBY STATE CAPABLE OF PERFORMING PRINTING |
| /PRNT | VC→EC | SIGNAL CAUSING VIDEO CONTROLLER 103 TO ISSUE PRINTING REQUEST TO ENGINE CONTROLLER 105 |
| /VSREQ | VC←EC | SIGNAL CAUSING ENGINE CONTROLLER 105 TO REQUEST VERTICAL SYNC SIGNAL TO VIDEO CONTROLLER 103 |
| /VSYNC | VC→EC | VERTICAL SYNC SIGNAL OUTPUT FROM VIDEO CONTROLLER 103 TO ENGINE CONTROLLER 105 |
| /BD | VC←EC | HORIZONTAL SYNC SIGNAL OUTPUT FROM ENGINE CONTROLLER 105 TO VIDEO CONTROLLER 103 |
| /CCRT | VC←EC | SIGNAL INFORMING VIDEO CONTROLLER 103 OF STATE CHANGE BY BECOMING "TRUE" WHEN CONTENT OF STATUS NOT DIRECTLY CONCERNING RDY SIGNAL CHANGES |
| /SCLK | VC→EC | SYNC CLOCK SIGNAL FOR SERIAL COMMUNICATION |
| /CMD | VC→EC | COMMAND SIGNAL CAUSING VIDEO CONTROLLER 103 TO ISSUE INSTRUCTION TO ENGINE CONTROLLER 105 |
| /CBSY | VC→EC | STROBE SIGNAL FOR COMMAND OUTPUT |
| /STS | VC←EC | SIGNAL REPRESENTING STATUS IN ENGINE UNIT OUTPUT FOR COMMAND FROM VIDEO CONTROLLER 103 |
| /SBSY | VC←EC | SIGNAL FOR STATUS OUTPUT |

FIG. 13

VC ··· VIDEO CONTROLLER
OC ··· OPTION CONTROLLER
EC ··· ENGINE CONTROLLER

| SIGNAL NAME | DIRECTION | CONTENTS |
| --- | --- | --- |
| SERIAL COMMUNICATION I/F | VC↔OC | I/F PERFORMING SHEET FEED DESIGNATION TO SHEET FEED OPTION, SHEET DISCHARGE BIN DESIGNATION TO SHEET DISCHARGE OPTION, COMMAND DESIGNATION, ETC. THROUGH SHARED MEMORY |
| /OPTRDY | VC←OC | SIGNAL REPRESENTING READY STATE FOR FUNCTION GIVEN IN DESIGNATED OPTION DEVICE |
| /POUTT | EC→OC | TIMING SIGNAL USED WHEN PRINTER BODY DISCHARGES RECORDING SHEET |
| /PFEDT | EC→OC | TIMING SIGNAL USED WHEN PRINTER BODY RECEIVES RECORDING SHEET FROM OPTION UNIT |
| /SPCNG | EC→OC | SIGNAL TO SLOW DOWN RECORDING SHEET HIGH-SPEED CARRIED IN OPTION DEVICE TO MATCH IT WITH CARRYING SPEED OF PRINTER BODY |

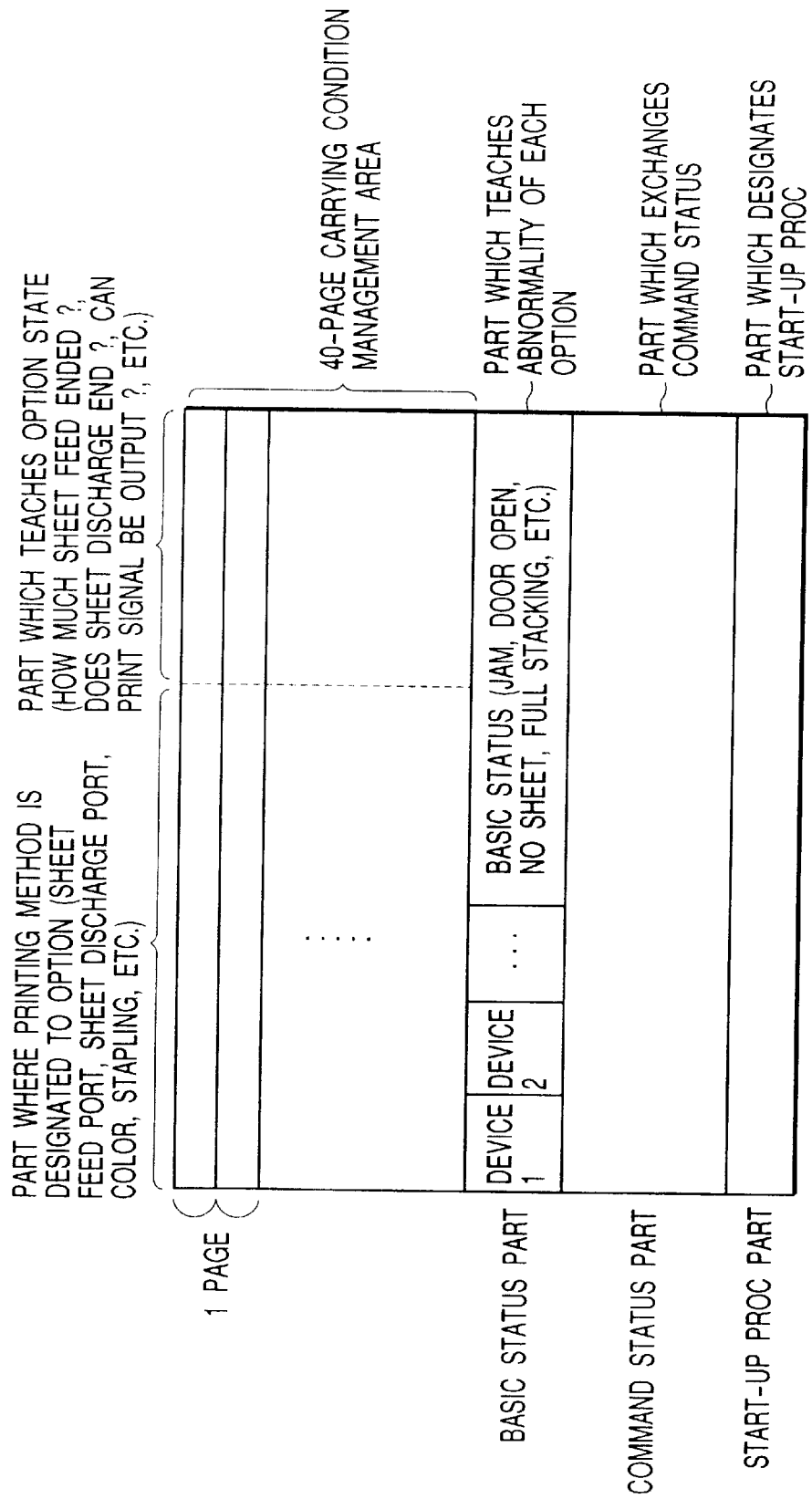

FIG. 26

STORAGE MEDIUM SUCH AS FD, CD-ROM, ETC.

| DIRECTORY INFORMATION |
|---|
| 1ST DATA PROC PROGRAM<br>PROGRAM CODE GROUP CORRESPONDING TO STEPS IN FLOW CHARTS OF FIG. 6 |
| 2ND DATA PROC PROGRAM<br>PROGRAM CODE GROUP CORRESPONDING TO STEPS IN FLOW CHARTS OF FIG. 7 |
| 3RD DATA PROC PROGRAM<br>PROGRAM CODE GROUP CORRESPONDING TO STEPS IN FLOW CHARTS OF FIG. 16 |
| 4TH DATA PROC PROGRAM<br>PROGRAM CODE GROUP CORRESPONDING TO STEPS IN FLOW CHARTS OF FIG. 17 |
| 5TH DATA PROC PROGRAM<br>PROGRAM CODE GROUP CORRESPONDING TO STEPS IN FLOW CHARTS OF FIG. 22 |
| 6TH DATA PROC PROGRAM<br>PROGRAM CODE GROUP CORRESPONDING TO STEPS IN FLOW CHARTS OF FIG. 23 |
| 7TH DATA PROC PROGRAM<br>PROGRAM CODE GROUP CORRESPONDING TO STEPS IN FLOW CHARTS OF FIG. 24 |
| 8TH DATA PROC PROGRAM<br>PROGRAM CODE GROUP CORRESPONDING TO STEPS IN FLOW CHARTS OF FIG. 25 |

MEMORY MAP OF STORAGE MEDIUM

OWNER: kakky    BIN 1 NAME: "kakky"
OWNER: yuichi    BIN 2 NAME: "yuichi"
OWNER: NONE    BIN 3 NAME: " "
OWNER: sakai    BIN 4 NAME: "sakai"
OWNER: sakai    BIN 5 NAME: "utsu"
OWNER: jmori    BIN 6 NAME: "COMMUNICATION IN JUNE"
OWNER: yuichi    BIN 7 NAME: "A4"

DATA PROCESSING APPARATUS, IMAGE RECORDING APPARATUS, METHOD OF CONTROLLING DATA PROCESSING APPARATUS, METHOD OF CONTROLLING IMAGE RECORDING APPARATUS AND STORAGE MEDIUM

BACKGROUND OF THE INVENTION

1. Field of the Invention

The present invention relates to a data processing apparatus and an image recording apparatus capable of transmitting printing data to an image recording apparatus having a plurality of containing units or an image recording apparatus connectable to option devices having a plurality of containing units, a method of controlling the data processing apparatus, a method of controlling the image recording apparatus, and a storage medium.

2. Related Background Art

Recently in an image recording apparatus such as a printer, when a plurality of users share an image recording apparatus having a plurality of sheet discharge ports, the following methods are suggested for separation:

(1) 1-job separation mode in which sheets are discharged to a vacant discharge port for each job;

(2) Pseudo mailbox mode in which fixed names are previously appended to the sheet discharge ports and they are changed to each other by designating their names; and (3) Sheet discharge method in which a vacant sheet discharge port is dynamically allocated to each user on the basis of user information included in printing data as described in the Japanese Patent Application No. 2-120068.

The above separation methods (1), (2) and (3) will be described below by using FIGS. 27, 28 and 29 which are their conceptual diagrams, respectively.

The 1-job separation mode (1) will be described, first.

Referring to FIG. 27, there is shown a conceptual diagram of assistance in explaining the above separation method, 1-job separation mode (1).

First, regarding the 1-job separation mode in (1), an example shown in FIG. 27 assumes that a printing job is transmitted to a printer in an order of user kakky, user yuichi, user jmori, user sakai, user kakky, user sakai, and user sakai.

In this example, the job switching is sensed inside the printer independently of an owner of the job and at a reception of a new job a sheet discharge port having no sheet stacking quantity is retrieved while sheet is continuously discharged for the job to the sheet discharge port determined at the start of the job.

In this manner, a mixture of jobs is prevented by switching sheet discharge ports before a sheet discharge for each job.

Next, the pseudo mailbox mode (2) is described below.

Referring to FIG. 28, there is shown a conceptual diagram of assistance in explaining the above separation method, pseudo mailbox mode (2).

Then, regarding the pseudo mailbox mode (2), an example in FIG. 28 shows a method of realizing a pseudo mailbox with operations of settings on the host computer.

For example, if seven users share a printer, the users set names of sheet discharge ports for the shared printer. At this time, the same user names need be set on all the host computers sharing the printer.

In the example in FIG. 28, an operation is performed assuming a director for bin 1, a room chief for bin 2, a supervisor for bin 3, a staff A for bin 4, a staff B for bin 5, a staff C for bin 6, and a secretary for bin 7. In printing, a required name is designated, by which the corresponding sheet discharge port is fixedly designated for a pseudo separation.

In this manner, a mixture of jobs is prevented by giving meanings to the sheet discharge ports appearing on screens of the host computers.

Next, the sheet discharge method described in the Japanese Patent Application Laid-Open No. 2-120068 (3) will be described below.

Referring to FIG. 29, there is shown a conceptual diagram of assistance in explaining the above separation method, a sheet discharge method described in the Japanese Patent Application Laid-Open No. 2-120068 (3).

In the sheet discharge method described in the Japanese Patent Application Laid-Open No. 2-120068 in (3), as shown in FIG. 29, a user name is added to printing data and sheet is discharged to a sheet discharge port used by the user or to a sheet discharge port having no sheet stacking quantity which has been retrieved if there is no sheet discharge port used by the user and registered as a sheet discharge port of the user.

If sheet is discharged in this method, only jobs of a single user are discharged to a certain sheet discharge bin and a bin used by each user can be reliably separated from others. Furthermore, a plurality of jobs of an identical user can be discharged to a single bin, which prevents an event that full stacking immediately occurs that has been a problem in a 1-job separation.

In addition there is no need for making complicated settings on the host computers of all the users sharing the printer so as to prevent a mixture of jobs.

In the above conventional examples of (1) to (3), however, there are problems described below.

In the 1-job separation mode (1), as described above, even if most of data requires a small number of sheets for one job, sheet discharge ports are switched to each other for sheet discharge for each job independently of job owners, which may cause a problem that full stacking occurs before a stacking capability of the sheet discharge port is used up.

In addition, in the pseudo mailbox mode (2), a name of a sheet discharge port of an image recording apparatus is registered on a host computer and then it is converted to a fixed designation to a sheet discharge port having the name, and therefore the same names need be registered on all the host computers sharing the image recording apparatus. The adjustment of settings on all the host computers sharing the image recording apparatus requires plenty of time and labor and neglecting this operation may cause a problem that sheets are discharged to a sheet discharge port not intended by the user.

For example, in the example shown in FIG. 28, the room chief sets names incorrectly, by which the bin of the director and that of the room chief are replaced to each other in the setting and it easily causes a problem that jobs of the director are mixed with those of the room chief at bin 1 and bin 2 disadvantageously.

Furthermore, in the sheet discharge method described in the Japanese Patent Application Laid-Open No. 2-120068 in (3), the separation is limited to separation for each user and it is hard to make separations adapted to purposes of a user.

For example, a user cannot select any of the following purposes in a sheet discharge operation:

Switching sheet discharge ports for each host computer to be used;

Switching sheet discharge ports for each application to be used;

Switching sheet discharge ports for each sheet type to be used;

Switching sheet discharge ports for each file to be printed;

Switching sheet discharge ports for each time period in which the printer is used;

In other words, printed sheets of an identical user are discharged to an identical bin and printing jobs cannot be flexibly separated according to purposes of sheet discharging for each user, which may lead to a problem of much inconvenience.

In addition, if a large amount of printing data is printed out with sharing an image recording apparatus, an operator call indicating full stacking is displayed at full stacking of a sheet discharge port registered for a user even if other bins are vacant, by which the user cannot print remaining data without removing stacked sheets on the sheet discharge port, which may lead to a problem that a large amount of data cannot be continuously printed.

Furthermore, even if the full stacking is not displayed at the time of the full stacking of a sheet discharge port which is being used by a user and sheets are discharged to a sheet discharge port corresponding to any vacant bin, sheets can be discharged to a plurality of bins, but vacant sheet discharge ports need be arbitrarily retrieved before the sheet discharge operation, which may cause a problem that recording sheets are forgot to be picked up, that a user cannot grasp where his or her own printed sheets are discharged without checking carefully all of the plurality of bins one by one, or that an order of printing jobs is confused. It is also necessary to cope with the disadvantages which may occur in an operation with a judgement of the apparatus for utilizing the stacking capability of the sheet discharge port.

SUMMARY OF THE INVENTION

Therefore it is an object of the present invention to provide a data processing apparatus, an image recording apparatus, a method of controlling the data processing apparatus, a method of controlling the image recording apparatus, and a storage medium that solve the above problems.

According to one aspect, the present invention which achieves this object related to a data processing apparatus, an image recording apparatus, a method of controlling the data processing apparatus, a method of controlling the image recording apparatus, and a storage medium in which various types of printed sheets are separated for sheet discharging for each user not only according to a user name, but also according to various purposes of sheet discharging so as to cope with various requests from users with making the most of the stacking capability of sheet discharge ports without a need for complicated settings or the like for each data processing apparatus and in which it is possible to solve disadvantages that may be caused by an operation executed for utilizing the stacking capability of the sheet discharge ports.

Other objects and features besides those discussed above shall be apparent to those skilled in the art from the description of preferred embodiments of the invention which follow and appended drawings.

BRIEF DESCRIPTION OF THE DRAWINGS

FIG. 12 is a diagram of assistance in explaining signals transmitted or received between a video controller (VC) and an engine controller (EC);

FIG. 13 is a diagram of assistance in explaining signals transmitted or received between the video controller (VC), the engine controller (EC), and an option controller (OC);

FIG. 15 is a typical diagram of a shared memory with the video controller secured in a RAM provided in the option controller shown in FIG. 9;

FIG. 26 is a diagram of assistance in explaining a memory map of a storage medium for storing various data processing programs readable by an image recording system to which are applicable the data processing apparatus and the image recording apparatus according to the present invention;

DETAILED DESCRIPTION OF THE PREFERRED EMBODIMENTS

[First Embodiment]

Embodiments of the present invention will be described below.

Figure 1:
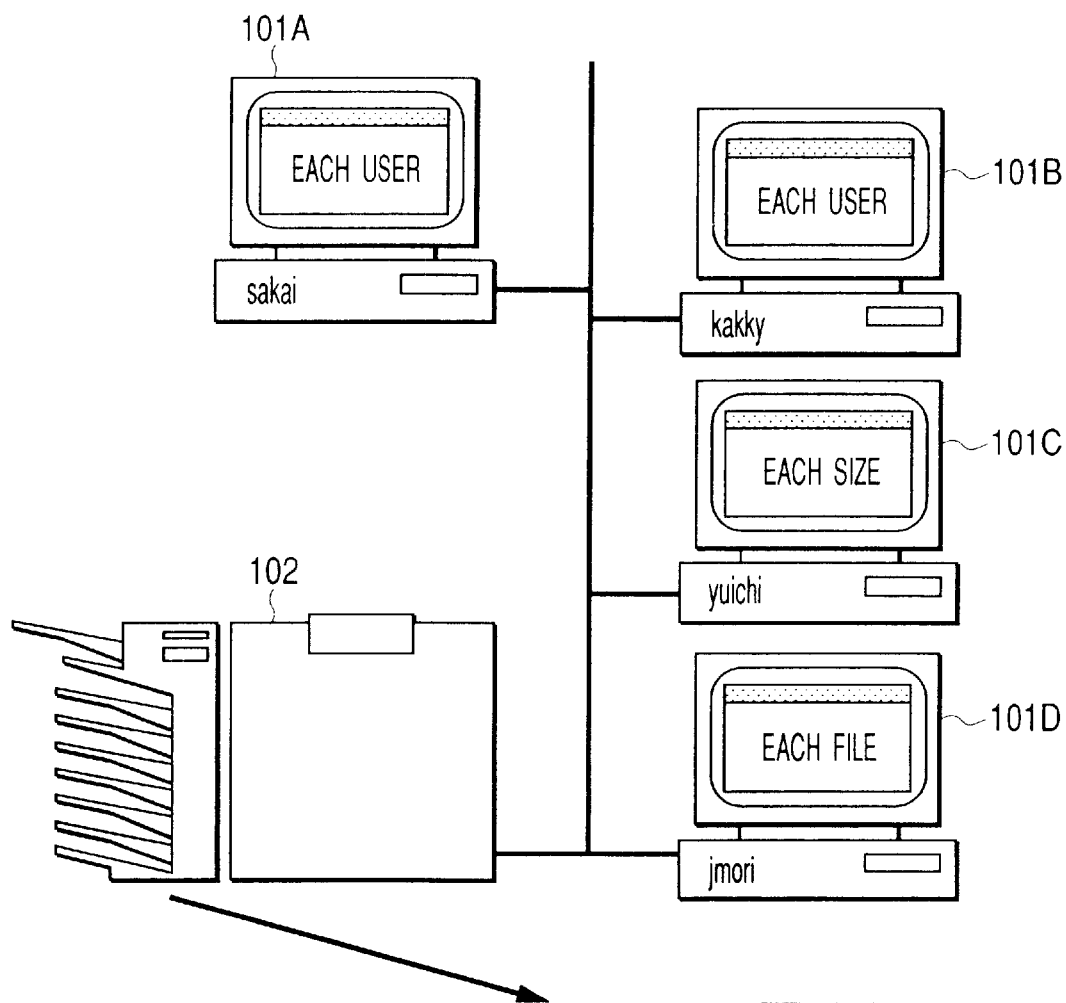
FIG. 1 is a conceptual diagram of assistance in explaining a separation method of an image recording system to which are applicable a data processing apparatus and an image recording apparatus according to a first embodiment of the present invention.

Referring to FIG. 1, there is shown a conceptual diagram of assistance in explaining a separation method of an image recording system to which are applicable a data processing apparatus and an image recording apparatus according to a first embodiment of the present invention. It corresponds to a conceptual diagram of discharging sheets with the separation and sheet discharging adapted to various purposes of a plurality of users by using sheet discharge bins of an image recording apparatus shared by the plurality of users.

An actual operation will be described below by referring to this diagram.

The sheet discharge method described below is used for flexible separation of printing jobs according to a purpose of a user and it is not limited to separation for a single job nor for each user. It is defined as a user separation in a wide sense and hereinafter referred to as user separation automatic mode.

As shown in this diagram, this embodiment will be described below by giving an example that an image recording apparatus is shared by four host computers, in other words, four users.

In this diagram, an image recording apparatus (printer) 102, which is connected to an external apparatus (host computer 101 (101A, 101B, 101C and 101D)) via a predetermined communication medium, for example, a LAN such as Ethernet, records an image to a recording medium on the basis of image information transmitted from each host computer and discharges it to one of the bins, bin 1 to bin 7.

Users of respective host computers have names sakai, kakky, yuichi, and jmori, respectively, and these names are registered as default values at login of the users after the start-up of the host computers.

These names can be edited by the users and be inputted from a user interface (UI) on the host computers. These user names can be used to allocate the sheet discharge bins to respective users. Some users, however, may require the separation in other methods and therefore more preferably a printer can be used so as to be adapted to needs of respective users.

In an example shown in FIG. 1, the user sakai and the user kakky require simply a separation for each user. The user yuichi, however, requires a separation for each sheet size for outputting data of various sizes. Furthermore, the user jmori requires a separation for each file for classifying data into files clearly.

This diagram shows an example in which the users having different needs share the printer 102 as described above.

After a determination of an operation of the printer 102, first, the user separation automatic mode is selected for indicating a mode which is characteristic of this embodiment by a host application on an operation panel 104 of the printer 102 or on each of the host computers 101A and 101D as setting of the sheet discharge mode of the printer 102.

Figure 2:
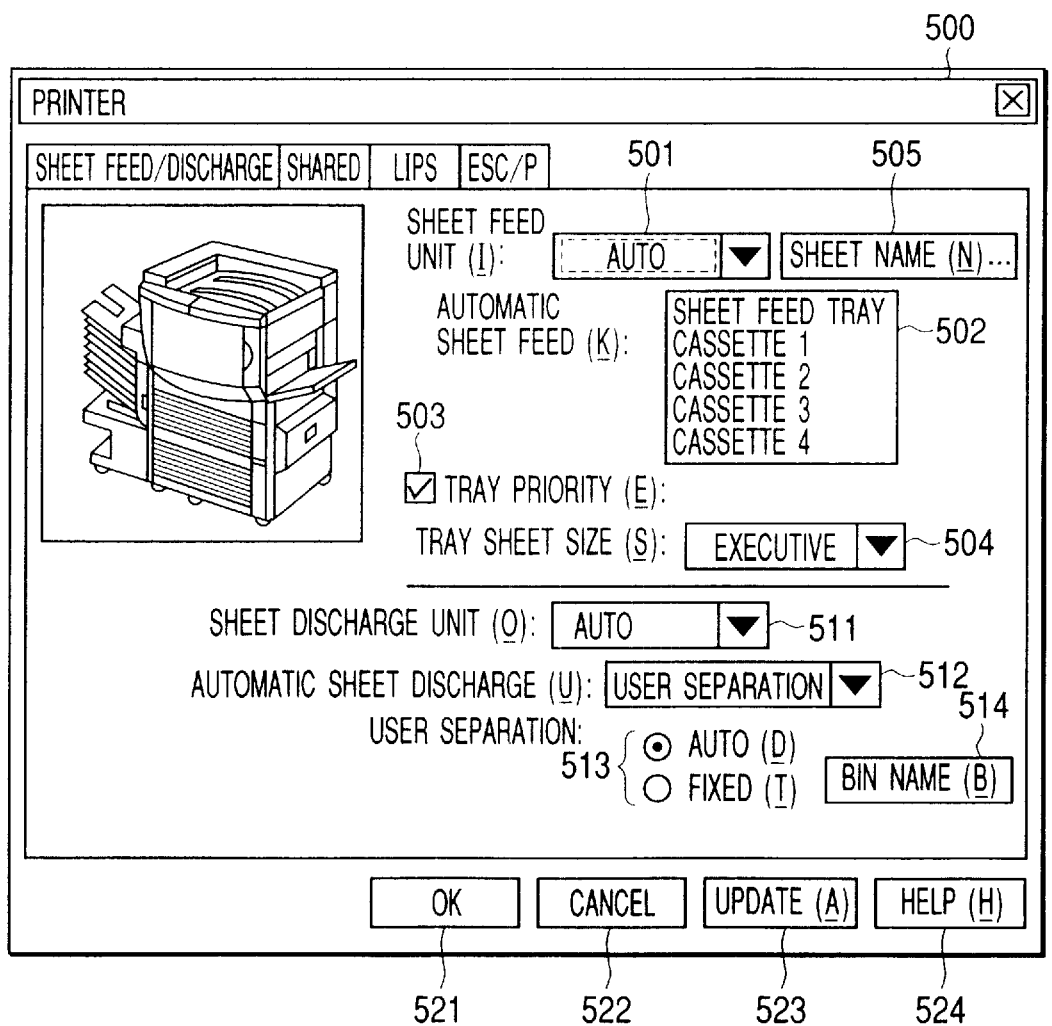
FIG. 2 is a typical diagram showing an example of a screen on which a sheet discharge mode is set for a printer by a host application on each host computer shown in FIG. 1.
Figure 5:
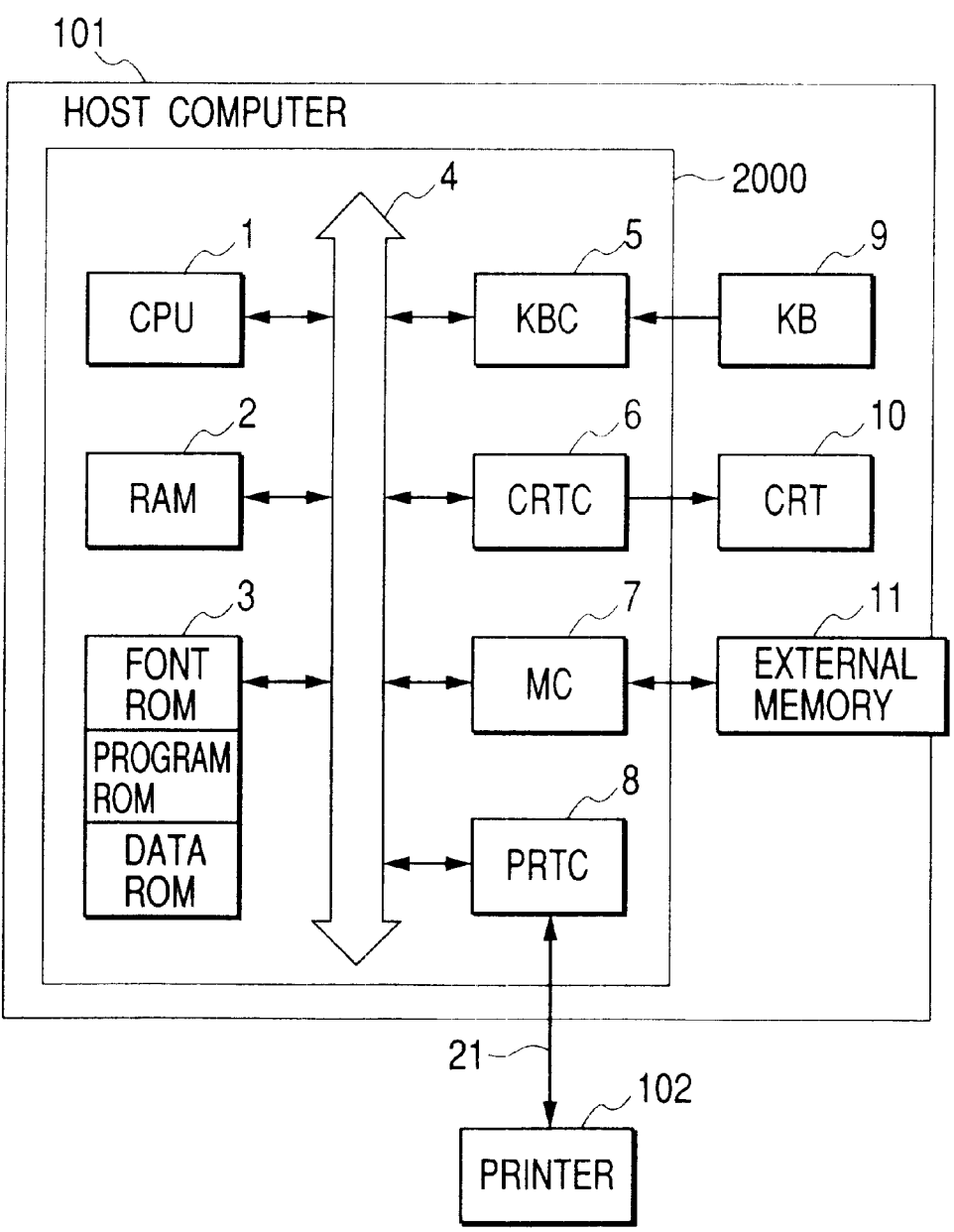
FIG. 5 is a block diagram of assistance in explaining a constitution of the host computer shown in FIG. 1.

Referring to FIG. 2, there is shown a typical diagram of an example of a screen for setting the sheet discharge mode for the printer 102 using the host application on each host computer 101 shown in FIG. 1, and the screen is displayed on a CRT 10 of the host computer 101 shown in FIG. 5.

In this diagram, a sheet feed mode or a sheet discharge mode of the image recording apparatus 102 can be set on a sheet feed/discharge setting screen 500.

In a sheet feed unit setting area 501, "AUTO" is set in this example. In an automatic sheet feed displaying area 502, sheet feed units capable of feeding sheet are displayed if the sheet feed unit setting area 501 is set to "AUTO". In a tray priority setting area 503, whether or not a tray priority is available can be selected if the sheet feed setting area 501 is set to "AUTO". In this example, an available tray priority is selected.

A tray sheet size setting unit 504 is used to set sheet sizes stored in the tray such as, for example, A4, B5, letter, executive sizes, and "EXECUTIVE" is set here. A sheet name setting window display button 505 is pointed at using a keyboard or a pointing device which is not shown to display a sheet name setting window which is not shown in order to set a sheet name.

In a sheet discharge unit setting area 511, "AUTO" is set in this example. An automatic sheet discharge setting area 512 can be used for setting if the sheet discharge unit setting area 511 is set to "AUTO" and "USER SEPARATION" is set here. In a user separation setting area 513, "AUTO" or "FIXED" can be selectively set if the automatic sheet discharge setting area 512 is set to "USER SEPARATION" and the area 513 is set to "AUTO" in this example. With this "AUTO" setting, the user separation automatic mode is set as the sheet discharge mode.

A bin name setting window display button 514 is pointed at using a keyboard or a pointing device which is not shown to display a bin name setting window which is not shown if "FIXED" is selected in the user separation setting area 513 in order to set a bin name. In other words, with the "FIXED" setting, the user separation fixed mode is set as the sheet discharge mode, by which a user can determine a bin to which recording sheets are to be discharged to operate the image recording apparatus 102 so as to discharge the recording sheets to the bin determined by the user.

An OK button 521 is pointed at using a keyboard or a pointing device which is not shown to validate the setting of the sheet feed/discharge setting screen 500 (in other words, a registration designation is transmitted to the printer 102) and then to terminate the sheet feed/discharge setting screen 500. A cancel button 522 is pointed at using a keyboard or a pointing device which is not shown to invalidate the setting of the sheet feed/discharge setting screen 500 and to terminate the sheet feed/discharge setting screen 500.

An update button 523 is pointed at using a keyboard or a pointing device which is not shown to validate the setting of the sheet feed/discharge setting screen 500 (in other words, a registration designation is transmitted to the printer 102). A help button 524 is pointed at using a keyboard or a pointing device which is not shown to display a help window which is not shown.

In an example shown in FIG. 2, the sheet discharge mode of the image recording apparatus 102 is set to the "USER SEPARATION AUTOMATIC".

The sheet feed mode or the sheet discharge mode on the sheet feed/discharge setting screen 500 shown in FIG. 2 generally need be set only once at the setting of the image recording apparatus after a determination of the operation method.

Next, setting of discrimination names adapted to purposes at printing will be described below.

Figure 3:
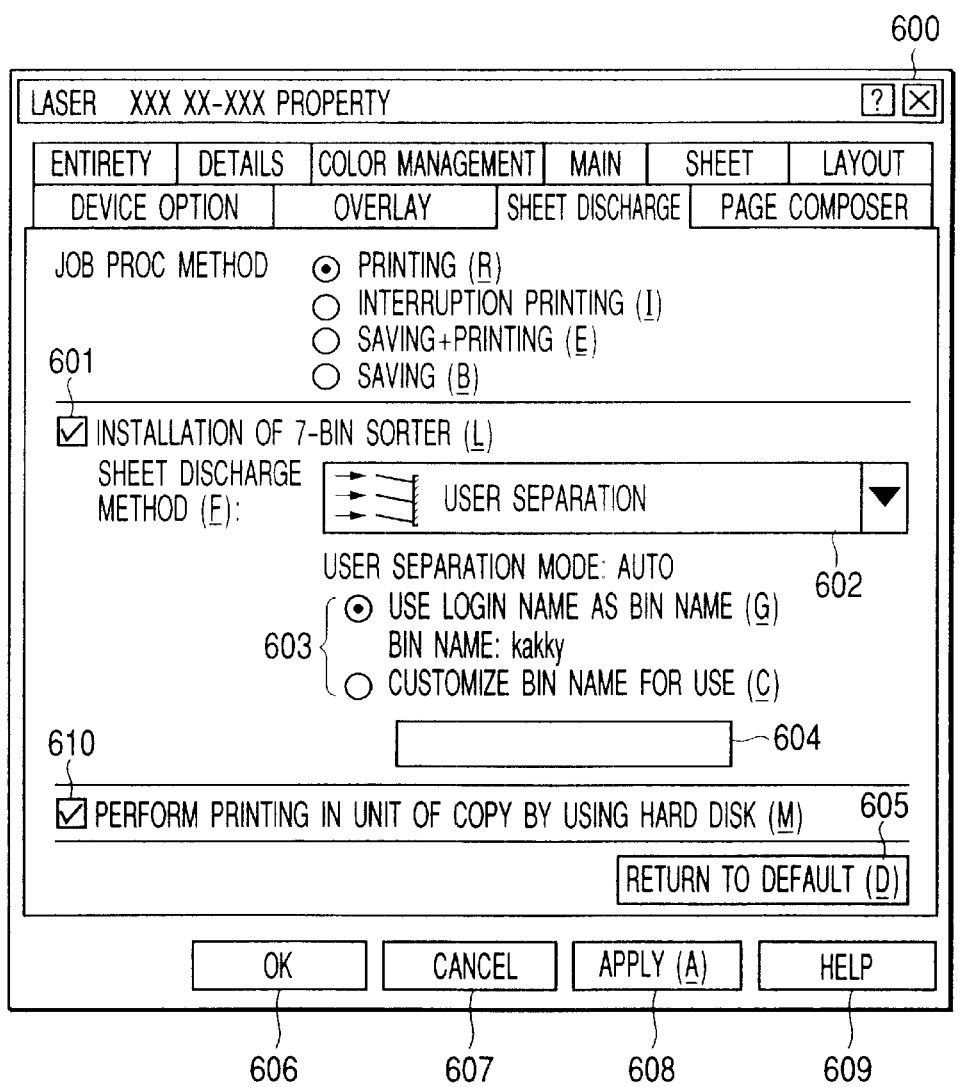
FIG. 3 is a typical diagram showing an example of a screen on which the sheet discharge mode is set in printing by the host application on each host computer shown in FIG. 1.
Figure 4:
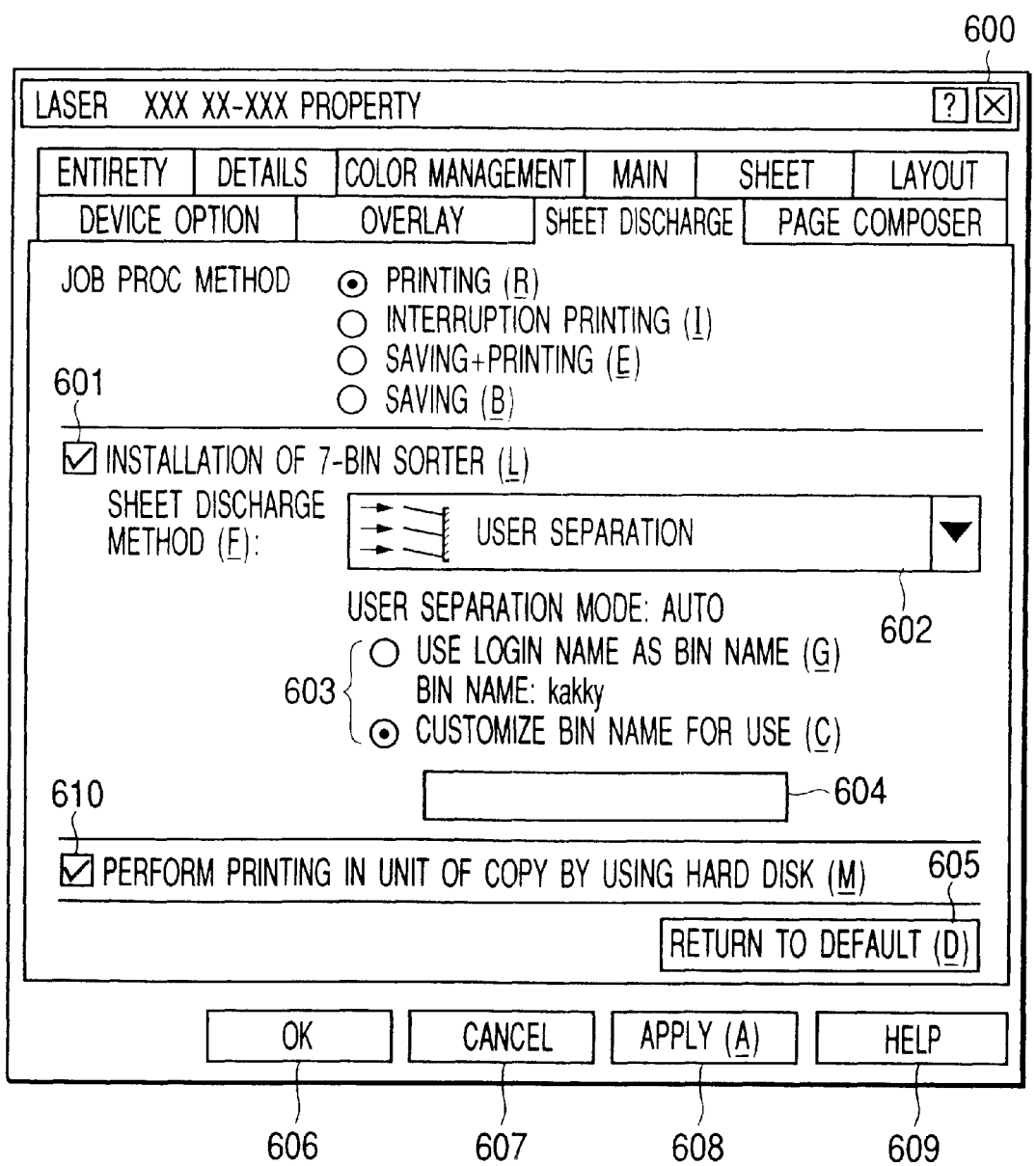
FIG. 4 is a typical diagram showing an example of a screen on which the sheet discharge mode is set in printing by the host application on each host computer shown in FIG. 1.

Referring to FIGS. 3 and 4, there are shown typical diagrams showing an example of a screen on which the sheet discharge mode is set in printing by the host application on each host computer shown in FIG. 1, and the screen is displayed on a CRT 10 of the host computer 101 shown in FIG. 5 described later.

Referring to FIGS. 3 and 4, there is shown a sheet discharge mode setting screen 600 in printing.

An indicator of installation of 7-bin sorter 601 indicates that the image recording apparatus 102 is installed in a 7-bin sorter. A reference numeral 602 designates a sheet discharge method setting area and "USER SEPARATION" is set here.

Selection of the user separation displays UI (the bin name setting area 603, the bin name input area 604) matching a type of the user separation preset to the printer 102.

A bin name setting area 603 can be used to select whether "USE LOGIN NAME AS BIN NAME" or "CUSTOMIZE BIN NAME FOR USE" at setting of the "USER SEPARATION AUTOMATIC".

A bin name input area 604 is used to input a name to be used as a bin name if "CUSTOMIZE BIN NAME FOR USE" is selected in the bin name setting area 603 for the bin name or to select one of options such as "SEPARATION FOR EACH HOST", "SEPARATION FOR EACH GROUP NAME", "SEPARATION FOR EACH APPLICATION", "SEPARATION FOR EACH SHEET SIZE", "SEPARATION FOR EACH SHEET TYPE", "SEPARATION FOR EACH FILE NAME", "SEPARATION FOR EACH TIME PERIOD", and "SEPARATION FOR EACH DATE". These options such as "SEPARATION FOR EACH HOST", "SEPARATION FOR EACH GROUP NAME", "SEPARATION FOR EACH APPLICATION", "SEPARATION FOR EACH SHEET SIZE", "SEPARATION FOR EACH SHEET TYPE", "SEPARATION FOR EACH FILE NAME", "SEPARATION FOR EACH TIME PERIOD", and "SEPARATION FOR EACH DATE" are assumed to be stored in a nonvolatile memory in a ROM 3 or a RAM 2 in FIG. 5 described later or in an external memory 11 or the like. In addition, the bin name newly inputted to the bin name input area 604 is stored in a nonvolatile memory in the RAM 2 in FIG. 5 or in the external memory 11 and then it can be one of the options from the next time with reconfiguration.

A button 605 is used to return to a default, and it is pointed at using a keyboard or a pointing device which is not shown to return the setting of the sheet discharge mode setting screen 600 in printing to the default setting.

A printing in unit of copy designation check box 610 is pointed at using a keyboard or a pointing device which is not shown to set printing in unit of copy for printing a plurality of copies.

An OK button 606 is pointed at using a keyboard or a pointing device which is not shown to validate the setting of the sheet discharge mode setting screen 600 in printing and then to terminate the sheet discharge mode setting screen 600 in printing. A cancel button 607 is pointed at using a keyboard or a pointing device which is not shown to invalidate the setting of the sheet discharge mode setting screen 600 in printing and then to terminate the sheet discharge mode setting screen 600 in printing.

An application button 608 is pointed at using a keyboard or a pointing device which is not shown to validate the setting of the sheet discharge mode setting screen 600 in printing. A help button 609 is pointed at using a keyboard or a pointing device which is not shown to display a help window which is not shown.

The example in FIG. 3 corresponds to a screen which appears when "USE LOGIN NAME AS BIN NAME" is selected in the bin name setting area 603 (default setting). For a printing job from a user who has made this setting, sheets are separated by the user before they are discharged. The example in FIG. 4 corresponds to a screen which appears when "CUSTOMIZE BIN NAME FOR USE" is selected in the bin name setting area 603. For a printing job from a user who has made this setting, sheets are separated by the name inputted (selected) in the bin name input area 604 before they are discharged.

As set forth in the above, the user sakai and the user kakky require an operation with a separation for each user and therefore the default setting is directly applied without a need for any particular operation. Designating the OK button 606 in FIG. 3 allows a separation for each user.

On the other hand, users who want to perform sheet discharge for the purpose like that of the user yuichi and the user jmori select "CUSTOMIZE BIN NAME FOR USE" in the bin name setting area 603 as shown in FIG. 4 and then input a name to be used in the bin name input area 604 or select one of the options such as "SEPARATION FOR EACH HOST", "SEPARATION FOR EACH APPLICATION", "SEPARATION FOR EACH SHEET SIZE", "SEPARATION FOR EACH SHEET TYPE", "SEPARATION FOR EACH FILE NAME", and "SEPARATION FOR EACH TIME PERIOD" and then to designate the OK button 606.

In the example shown in FIG. 1, the user yuichi selects "SHEET SIZE" in the bin name input area 604 and the user jmori selects "FILE" in the bin name input area 604.

After required settings are made as described above, only a printing designation is needed in the user separation designation to perform a separation for each purpose.

As apparent from the screens shown in FIGS. 3 and 4 (the sheet discharge mode setting screen 600 at printing), a user has no need to designate a sheet discharge port, but the user is required only to transmit printing data in the user separation setting in order to achieve a desired separation preset on the sheet discharge mode setting screen 600 at printing in FIGS. 3 and 4. As set forth hereinabove, in the user separation automatic mode, the apparatus appropriately checks states of sheet discharge bins or the like in the image recording apparatus for executing appropriate separation processing automatically (the details will be described later) so as to make the most of the sheet discharge bins to reduce loads on the users to the minimum.

For example, it is assumed that the user sakai and the user kakky execute printing after setting login names to the bin names on the sheet discharge mode setting screen 600, the user yuichi customizes the bin name on the sheet discharge mode setting screen 600, sets the separation for each sheet size to the bin name, and executes printing of size A3 and size A4, while the user jmori customizes a bin name on the sheet discharge mode setting screen 600, sets the separation for each file, and executes printing of a "designation" file and a "Communication in June" file.

As a result, as shown in FIG. 1, sheets are discharged to bin 4 and bin 5 for the job of the user sakai, bin 1 for the job of the user kakky, bin 2 for the size A3 job and bin 7 for the size A4 job of the user yuichi, and bin 3 for the designation job and bin 6 for the Communication in June job of the user jmori and therefore it is possible to achieve a separation adapted to purposes of respective users.

While the printing job of the user sakai is output to bin 4 and bin 5, the same discrimination name (bin name) is never registered without order like bin1 and bin 3. This simplifies an order of printing jobs whose printed sheets are stacked on the bin with the name if there are a plurality of bins having the same name (in this case, the upper-stage bin 4 is used for an older job).

Referring to FIG. 5, there is shown a block diagram of assistance in explaining a constitution of the host computer 101 shown in FIG. 1.

In this diagram, a CPU 1 can transmit or receive data to or from the printer 102 on the basis of a program (various application programs, a printer driver, or the like) stored in a program ROM of the ROM 3 and integrally controls respective devices connected to a system bus 4.

In addition, a font ROM of the ROM 3 is used to store font data or the like and a data ROM of the ROM 3 is to store various data. The RAM 2 serves as a main memory of the CPU 1, a work area or the like.

A keyboard controller (KBC) 5 controls key inputs from a keyboard 9 or a pointing device which is not shown. A CRT controller (CRTC) 6 controls screens of the CRT display (CRT) 10. A memory controller (MC) controls accesses to an external memory 11 such as a hard disk (HD) or a floppy disk (FD) for storing font data, user files, or editing files.

A printer controller (PRTC) 8 is connected to the printer 102 via a predetermined communication medium (any of a local interface regulated by the IEEE1284 or the like and a network interface such as Ethernet) to execute communication control processing with the printer 102.

The CPU 1 executes, for example, development processing of an outline font to a display information RAM set on the RAM 2 so as to achieve WYSIWYG on the CRT 10.

Furthermore, the CPU 1 opens registered various windows on the basis of a command pointed at using a mouse cursor (pointer) which is not shown on the CRT 10 to execute various types of data processing.

In addition, the RAM 2 is assumed to have a nonvolatile memory such as an NVRA internally.

With referring to FIGS. 6 and 7, there will be provided below a detailed description of the concept in printing of an image recording system applicable to the data processing apparatus and the image recording apparatus of the present invention shown in FIG. 1.

Figure 6:
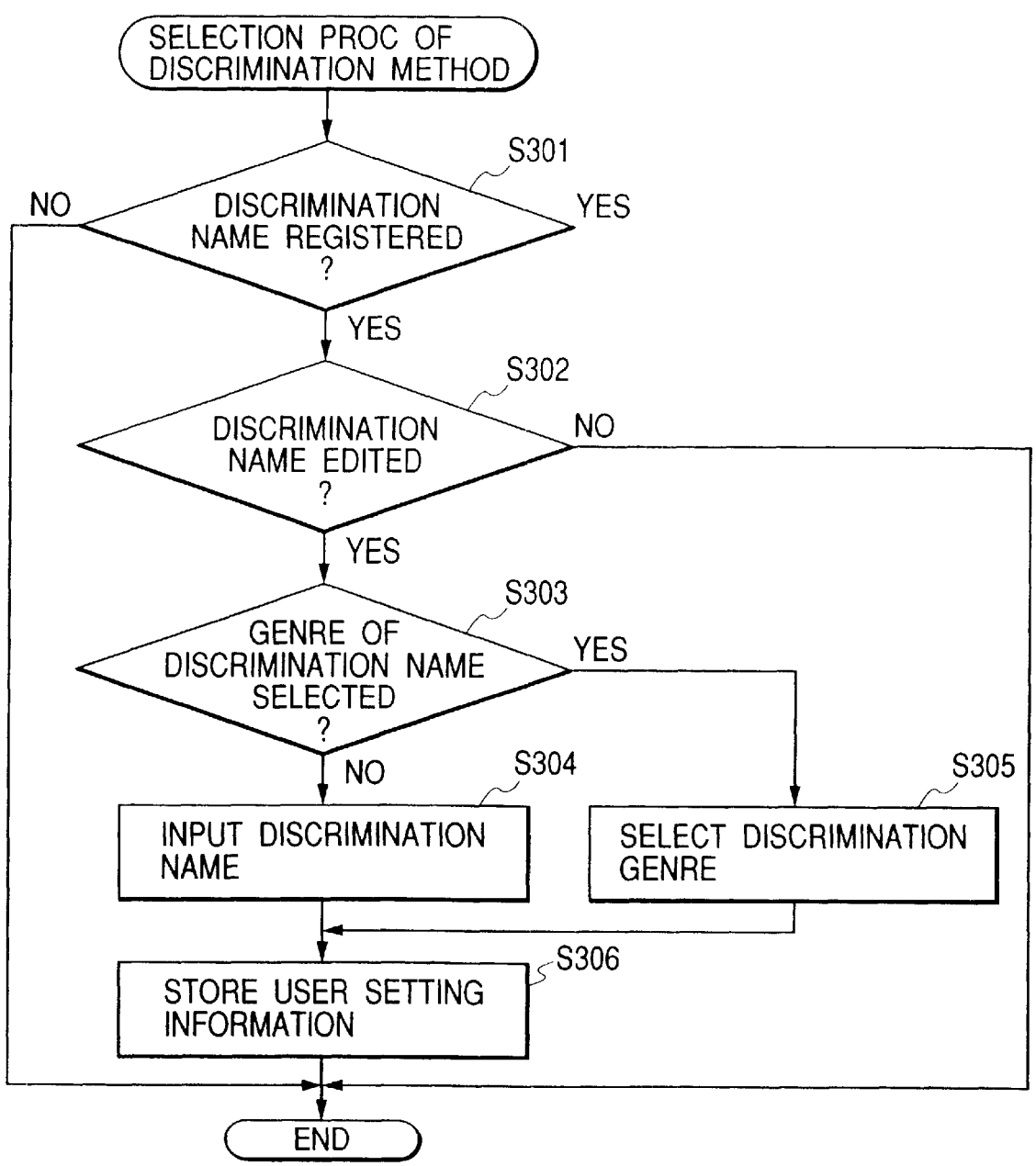
FIG. 6 is a flow chart showing a first processing procedure of an image recording system to which are applicable the data processing apparatus and the image recording apparatus according to the present invention.

Referring to FIG. 6, there is shown a flow chart of a first processing procedure of the image recording system to which the data processing apparatus and the image recording apparatus of the present invention are applicable, corresponding to a processing procedure for selecting an discrimination name used for designating the user separation automatic sheet discharge, and the CPU 1 in the host computer 101 shown in FIG. 5 executes the processing procedure on the basis of a program stored in the ROM 3 or other storage mediums. S301 to S306 indicate respective steps.

In step S301, it is judged whether or not the discrimination name is registered. In other words, it is judged whether or not the user specifies sheet discharge in the user separation automatic mode.

If an discrimination name is not to be registered in step S301, in other words, if the user specifies sheet discharge in a mode other than the user separation automatic mode, the discrimination name need not be registered, and therefore the processing is terminated directly.

On the other hand, if an discrimination name is registered in step S301, in other words, if the user specifies sheet discharge in the user separation automatic mode, the user progresses to step S302 to select an discrimination name to be used in the bin name setting area 603.

In step S302, it is judged whether or not the discrimination name is to be edited, in other words, if a bin name is customized for use; if the discrimination name is not judged to be edited ("USE LOGIN NAME AS BIN NAME" is selected in the bin name setting area 603), the discrimination name need not be edited and therefore the processing is terminated directly.

On the other hand, if the discrimination name is judged to be edited ("CUSTOMIZE BIN NAME FOR USE" is selected in the bin name setting area 603) in step S302, it is judged whether or not a genre of the discrimination name is to be selected in step S303 and then if the genre of the discrimination name is judged to be selected, the control progresses to step S305 to select one of the options such as, for example, "SEPARATION FOR EACH HOST", "SEPARATION FOR EACH APPLICATION", "SEPARATION FOR EACH SHEET SIZE", "SEPARATION FOR EACH FILE NAME", and "SEPARATION FOR EACH TIME PERIOD" in the bin name input area 604 and then progresses to step S306.

On the other hand, if a genre of the discrimination name is judged not to be selected in step S303, the control progresses to step S304 to input a bin name in the bin name input area 604 and then to step S306.

Next, in step S306, user setting information (information set on the sheet discharge mode setting screen 600 (discrimination name or the like)) is stored in a nonvolatile memory in the RAM 2 or an external memory 11 such as a hard disk or the like and then the processing is terminated.

The stored user setting information is used to determine information added to printing data at printing with a designation of the user separation automatic mode.

Next, by using FIG. 7, there is provided a description below on printing data generation and transmission processing after the user setting shown in the flow chart in the above FIG. 6 and the user's printing designation.

Figure 7:
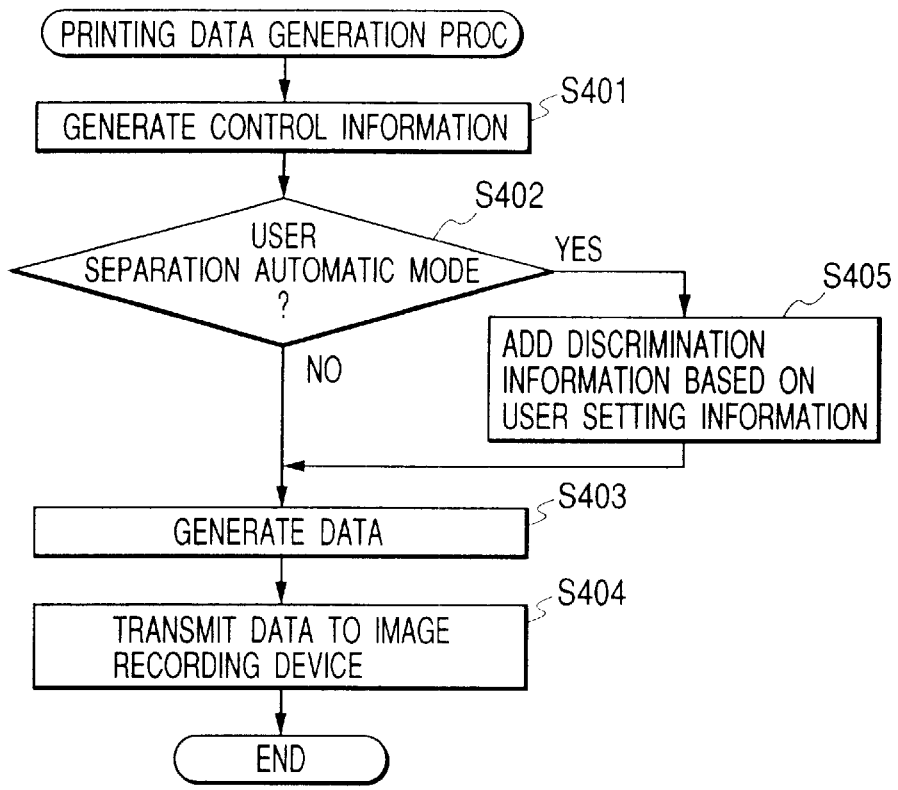
FIG. 7 is a flow chart showing a second processing procedure of an image recording system to which are applicable the data processing apparatus and the image recording apparatus according to the present invention.

Referring to FIG. 7, there is shown a flow chart of a second processing procedure of an image recording system to which the data processing apparatus and the image recording apparatus of the present invention are applicable, corresponding to a processing procedure on a host computer for generating printing data to be transmitted to the image recording apparatus when printing is designated, and the CPU 1 in the host computer 101 shown in FIG. 5 executes the processing procedure on the basis of a program stored in the ROM 3 or other storage mediums. S401 to S405 indicate respective steps.

When a user specifies printing, control information such as sheet feed/discharge setting is generated in step S401, first.

Next, in step S402, it is judged whether or not the user separation automatic mode is designated; if the user separation automatic mode is judged not to be designated, data is generated with a sheet discharge designation adapted to each mode in step S403 and then the data is transmitted to the image recording apparatus in step S404.

On the other hand, if the user separation automatic mode is judged to be designated in step S402, an discrimination name added to printing data is determined on the basis of user setting information for discrimination stored (set) in step S306 in FIG. 6 in step S405.

The default name is a login name. If a name edited by the user is registered, previously inputted user name is added. Otherwise, if any option is selected out of the options such as separation for each host (host ID), separation for each application (identifier), separation for each sheet size (designated sheet size), separation for each file name (file name), and separation for each time period (time), each information managed in the host computer is added.

Next, in step S403, printing data is generated (printing job generation). If there is any discrimination information determined to be added in step S405 at this time, the discrimination information is added to generate the printing data.

Next, in step S404, data is transmitted to the image recording apparatus 102.

Figure 8:
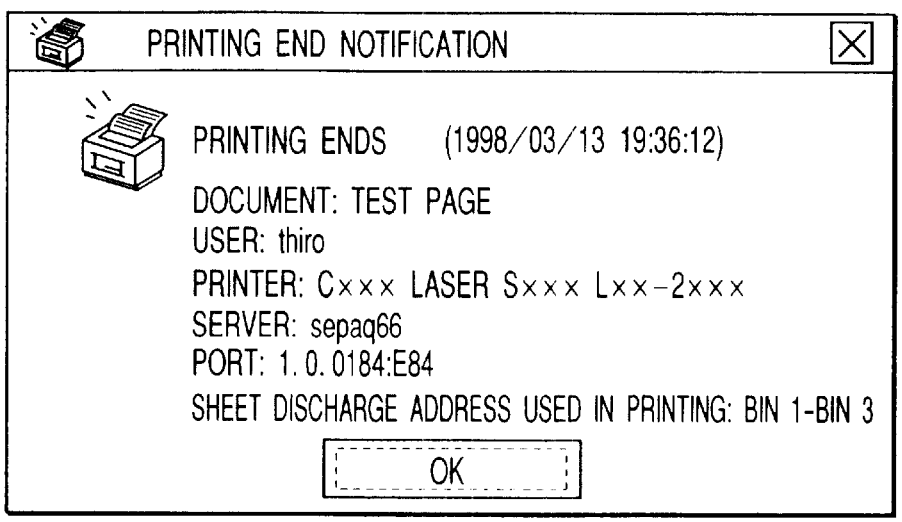
FIG. 8 is a typical diagram showing a printing end notification transmitted from the image recording apparatus to a host computer.

After the sheet discharge operation is completed for the printing job, the host computer 101 receives a job end notification from the image recording apparatus 102 and displays a screen as shown in FIG. 8, for example, so that the user can recognize the sheet discharge bin he or she actually uses.

Referring to FIG. 8, there is shown a typical diagram of a printing end notification transmitted from the image recording apparatus 102 to the host computer 101, the notification being displayed in a display unit of the host computer 101.

With this display, the user can recognize which bin his or her printing job is outputted to at a glance.

Next, by using FIGS. 9 to 21, a constitution of the image recording apparatus 102 shown in FIG. 1 will be described below.

Figure 9:
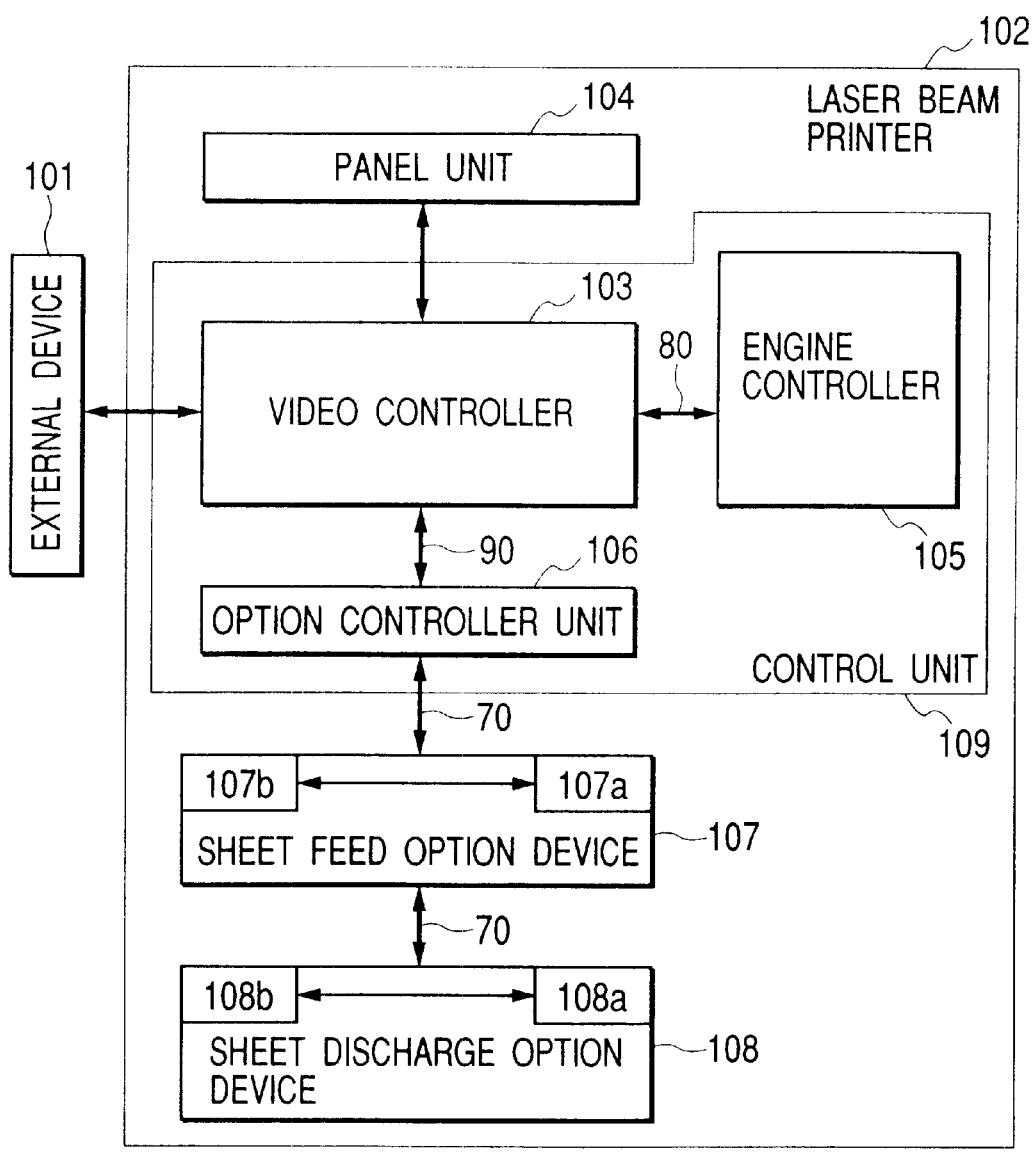
FIG. 9 is a block diagram of assistance in explaining a constitution of a laser beam printer to which the image recording apparatus in FIG. 1 is applicable.

Referring to FIG. 9, there is shown a block diagram of assistance in explaining a constitution of a laser beam printer to which the image recording apparatus 102 in FIG. 1 is applicable; the same reference characters are added to the same parts as those in FIG. 1.

Apparently the image recording apparatus to which this embodiment is applicable is not limited to a laser beam printer, but it is applicable to an ink jet printer or any printers in other printing systems.

While two option units are connected in an example given below for the following description and drawings, still more option units can be connected and functions of the option units can be shared with the printer body.

In this diagram, the laser beam printer (printer) 102 is connectable to various option devices and is connected to an external device 101 such as a host computer via a general-purpose interface (for example, Centronics, RS232C, USB) or a network (for example, Ethernet) for image recording based on printing information transferred from the external device 101 via a general-purpose interface (control information such as code data based on a predetermined printer language including post script, LIPSIII, LIPSIV, and image data, for example).

A video controller 103 is connected to the external device 101 via the above general-purpose interface to receive code data (ESC code, various PDL data, or the like) transferred from the external device 101 via the above general-purpose interface, to generate page information consisting of dot data based on the code data, to transmit image data (binary or multivalued) to an engine controller 105 described later via the video interface 80, and to transmit a command of the sheet feed designation or the sheet discharge designation to the option controller unit 106 described later via an integrating interface 90. The engine controller 105 forms a latent image on a photosensitive drum in a known electrophotography process on the basis of the image data transferred from the above video controller 103 and transfers and fixes it to a supplied sheet for printing. At this time, the sheet feed and discharge timing is designated for the option controller unit 106.

A panel unit 104 is an interface with a user comprising various switches (buttons) for operations, an LED indicator, and an LCD indicator. A user can designate a predetermined operation for the printer 102 by operating the panel unit 104. Various types of data set by the user is stored in a nonvolatile memory which is not shown, for example, NVRAM or EEPROM for management.

The option controller unit 106 having a CPU, a ROM, a RAM or the like which are not shown is an integrating controller for controlling one or more option devices (units) integrally on the basis of a sheet feed/discharge designation transferred from the video controller 103 or a sheet feed/discharge designation from the engine controller 105, and the controller 106 communicates with an option controller unit included in various types of option devices via an option unit interface 70 to control various types of the option devices integrally.

In addition, the RAM of the option controller unit 106 contains a shared memory (shown in FIG. 15 described later) accessible by the video controller 103 and the shared memory comprises a carrying condition management area of approx. 40 pages, a basic status area, a command status management area, and a start-up processing area. The video controller 103 specifies data for respective option devices via respective areas of the above shared memory.

The above carrying condition management area comprises an area for a notification of printing methods (sheet feed port, sheet discharge port, color, stapling, shifting, etc.) transmitted from the video controller 103 to respective option devices and an area for a notification of respective option states (How much printing ended?, Does sheet discharge end?, etc.) transmitted to the video controller 103.

A basic status area is used for notifying the video controller 103 of an abnormality (jam, no sheet, no staple, etc.) of each option device, a command and status management area is for transmitting or receiving command status to or from the video controller 103, and a start-up processing area is for a designation of starting each option device made by the video controller 103.

A sheet feed option device (unit) 107 is, for example, a paper deck option unit, internally having a paper deck controller (large-capacity sheet feeding cassette controller) 107a so as to control sheet feeding on the basis of control information transmitted from the option controller unit 106. The above paper deck controller 107a has a CPU, a ROM, and a RAM which are not shown and the CPU controls the sheet feed option device 107 based on a program stored in the ROM. In addition, the ROM stores extended information of the sheet feed option device 107 such as, for example, sheet size information or the like which can be stored in the paper deck.

A sheet discharge option device (unit) 108 is, for example, a sorter option unit having a sorting function, internally having a sorter controller (large-capacity sheet discharging stacker controller) 108a so as to perform a sorting or discharging operation based on control information transmitted from the option controller unit 106. The above sorter controller 108a has a CPU, a ROM, and a RAM which are not shown and the CPU controls the sheet discharge option device 108 based on a program stored in the ROM. In addition, the ROM stores extended information of the sheet discharge option device 108 such as, for example, the number of sheet discharge bins, presence or absence of a sorting function, presence or absence of a stapling function, presence or absence of a shifting function for shifting discharged sheet in a predetermined direction, and presence or absence of an inverting function for inverting the direction of the face of the discharged sheet.

There are provided operator units (controllers) 107b and 108b having a display unit and various keys for the sheet feed option device 107 and the sheet discharge option device 108, respectively, so as to display a message to a user in using each option and an operation method or the like and to perform various operations.

A control unit 109 comprises the engine controller 105 for controlling printing processes of the printer 102, the video controller 103 for analyzing data from the external device 101 such as a host computer and converting it to image data with controlling the entire printer 102, and the option controller unit 106 for integrating and controlling various option units.

The option controller unit 106 controls various option units by using a shared option unit interface 70 and communicates with the video controller 103 via the integrating interface 90. This embodiment is characterized by the video controller 103 controlling each sheet feed/discharge option unit via the option controller unit 106.

Figure 10:
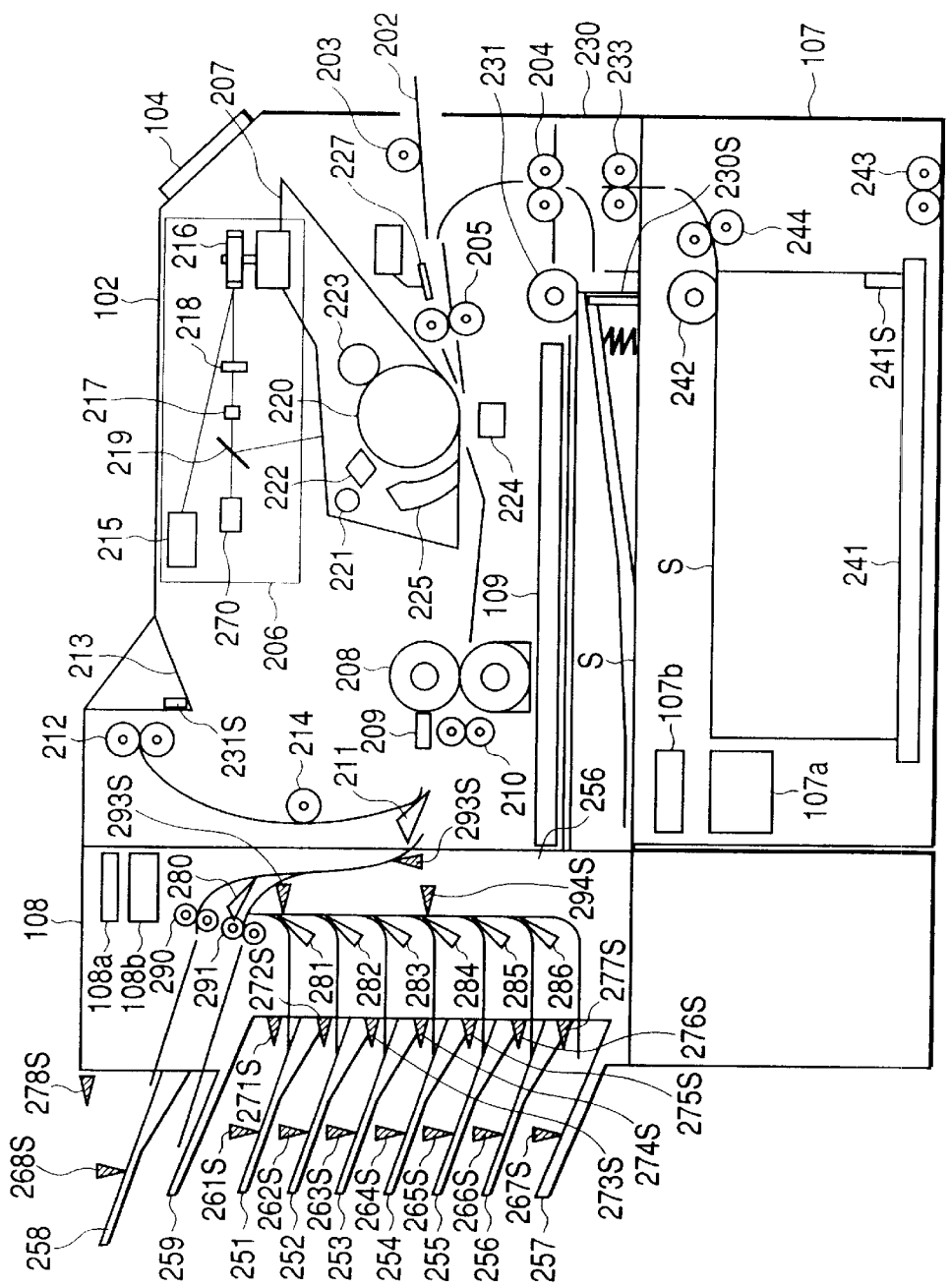
FIG. 10 is a cross section of assistance in explaining a constitution of a printer shown in FIG. 9.

Referring to FIG. 10, there is shown a cross section of assistance in explaining a constitution of the printer 102 shown in FIG. 9. The same reference characters are appended to the same parts as for those in FIG. 9.

In this diagram, a sheet cassette 230 holds recording sheets S, having a mechanism for electrically detecting a size of the recording sheet S by using dividers which is not shown. A cassette sheet feed clutch 231 is a cam for separating only the uppermost recording sheet from other recording sheets S stacked on the sheet cassette 230 and carrying the recording sheet S separated from others by a driving means which is not shown to a sheet feed roller 204, rotating intermittently at every sheet feeding so as to feed a recording sheet per rotation. A recording sheet detecting sensor 230S detects a quantity of recording sheets S held by the sheet cassette 230.

A registration shutter 227 stops sheet feeding by pushing the sheet. A sheet feed roller 204 carries a tip portion of the recording sheet S to the registration shutter 227. Reference numeral 202 designates a manual feed tray and the recording sheet S is placed on it. A manual feed clutch 203 carries the recording sheet S placed on the manual feed tray 202 to the registration shutter 227. An option sheet feed roller (sheet feed relay carrying roller) 233 carries the recording sheet S fed by the sheet feed option 107 to the inside of the printer 102 body.

In the downstream of the manual sheet feed roller 203, the cassette sheet feed clutch 231, the option sheet feed roller 233 there is provided a registration roller pair 205, and in the downstream of the registration roller there is provided an image recording unit 207 for forming a toner image on the recording sheet S by means of laser beams emitted from a laser scanner unit 206 in a known electrophotography process.

In the laser scanner unit 206, a laser unit 215 emits a laser beam on the basis of an image signal (VDO signal) transmitted from the video controller 103. The laser beam emitted from the laser unit 215 is scanned by a polygon mirror 216 and forms a latent image on a photosensitive drum 220 through an imaging lens group 218 and a reflecting mirror 219. A beam detector 217 detects the laser beam emitted from the laser unit 215 and outputs a main scanning synchronization signal. A light quantity sensor 270 detects a light quantity of the laser beam emitted from the laser unit 215.

In the image recording unit 207, a primary charger 222 charges the surface of the photosensitive drum 220 uniformly. A developing unit 223 is charged by the primary charger 222 and develops with toner the latent image formed on the photosensitive drum 220 after the laser exposure in the laser scanner unit 206. A transfer charger 224 transfers the toner image on the photosensitive drum 220 developed by the developing unit 223 to the recording sheet S fed by the registration roller 205. A cleaner 225 removes residual toner on the photosensitive drum 220. A front exposure lamp 221 optically eliminates residual charge on the photosensitive drum 220.

A fixing unit 208 thermally fixes the toner image formed on the recording sheet S by the image recording unit 207 to the recording sheet S. A carrying roller 210 carries the recording sheet S for sheet discharge. A sheet discharge sensor 209 detects a sheet discharge state of the recording sheet S. A flapper 211 changes the carrying direction of the recording sheet S completed to be recorded to the side of the sheet discharge tray 213 or to the side of the sheet discharge option 108. Sheet discharge rollers 214 and 212 discharge the recording sheet S carried by the changeover of the flapper 211 to the stacking tray 213. A sheet discharge stacking quantity detecting sensor 213S detects the stacking quantity of the recording sheets S stacked on the stacking tray 213.

The engine controller 105 in the control unit 109 controls the electrophotography process by using the laser scanner unit 206, the image recording unit 207, and the fixing unit 208 and executes the carrying control of the recording sheets in the printer 102 body.

Furthermore, the video controller 103 is connected to the external device such as a personal computer via a general-purpose interface (for example, Centronics, RS232C, etc.) so as to develop the image information transmitted via the general-purpose interface to bit data and to transmit the bit data to the engine controller 105 via the video interface 80 as a VDO signal.

Next, a description will be given for various option units detachably connected to the printer 102 body.

The option controller unit 106 shown in FIG. 9 is installed in the printer body shown in FIG. 10 and configured so that various option units can communicate with each other in the identical protocol via the option unit interface 70 which is a common path. In addition, the option controller unit 106 is connected to the video controller 103 via the integrating interface 90.

In the sheet feed option device 107 such as a paper deck option unit, a large quantity of recording sheets S are stacked on a paper deck 241 which moves up and down. A paper deck sheet feed roller 242 is used to feed the recording sheets S stacked on the paper deck 241.

A carrying roller 244 carries the recording sheet S fed from the paper deck sheet feed roller 242 in the direction of option sheet feed roller 233. A sheet feed relay carrying roller 243 is used for relay-carrying of recording sheets fed by other sheet feed option units (option units capable of feeding recording sheets having difference sizes or an identical size) detachably connectable by a plurality of units at the bottom of the paper deck option. A recording sheet storage quantity detecting sensor 241S detects a stacking quantity of the recording sheets S stacked on the paper deck 241.

The sheet feed option device 107 such as a paper deck option unit is controlled by the paper deck controller 107a.

In the sheet discharge option unit 108 such as a sorter option unit, reference numerals 251 to 257 designate first sheet discharge bin to seventh sheet discharge bin for face-down sheet discharging and already recorded recording sheets S are separated and stacked on these bins. An eighth sheet discharge bin 258 directly passes the sheet straight delivered to the sorter option for face-up sheet discharging.

A flapper 280 is used for a carriage changeover of the recording sheet S directed by the flapper 211 of the printer 102 body and then conveyed to the sorter option unit 108 so that the sheet face changeover is executed on the basis of the instruction from the video controller 103. In addition, sheet discharge empty detecting sensors 261S to 268S are used to detect the presence or absence of stacked recording sheets to be discharged to the first to eighth sheet discharge bins 251 to 258.

Furthermore, sheet discharge stacking quantity detecting sensors 271S to 278S are used to detect stacking quantities (stacking quantity 0 (vacant) to full stacking) of the recording sheets stacked on the first to eighth sheet discharge bins 251 to 258. When heights of the recording sheets stacked on the first to eighth sheet discharge bins 251 to 258 reaches (are detected to be), for example, 18 mm (equivalent to approx. 120 sheets), the sorter controller 108 notifies the option controller unit 106 of the full stacking via the video controller 103.

Each bin of the first to eighth sheet discharge bins 251 to 258 is capable of containing approx. 120 sheets, in other words, approx. 960 sheets can be stacked on the eight bins in total. Sorting sheet discharge is available for the first to seventh sheet discharge bins 251 to 257 among them.

If the face-up discharge is designated by the video controller 103 through the integrating interface 90, the face-up flapper 280 is set on for the direction changeover and the directed recording sheet S is conveyed directly to the sheet discharge port by a roller 290. If the face-down discharge is designated by the video controller 103 through the integrating interface 90, the face-up flapper 280 is set off for the direction changeover and the directed recording sheet S is once conveyed by a roller 291 until a rear end of the recording sheet S exceeds the face-up flapper 180, the roller 291 is reversed so that the recording sheet S is fed from its rear end to a vertical path, and bin flappers 281 to 286 are driven at predetermined timings according to designated sheet discharge bins for directing the recording sheet to each face-down sheet discharge port to complete the sheet discharge in the face-down state. If the seventh sheet discharge bin 257 is designated, the bin flapper is not driven before discharging the recording sheet to complete the face-down sheet discharge.

Additionally if the stapling is designated through the integrating interface 90 by the video controller 103 regarding a stapler which is not shown, recording sheets S are stacked on a stapling tray which is not shown, the recording sheets S are aligned, and then the stapler executes the stapling operation before discharging the recording sheets to one of the first to eighth sheet discharge bins 251 to 258. If the shifting operation is designated through the integrating interface 90 by the video controller 103, recording sheets are stacked on the stapling tray which is not shown in the same manner as for the stapling designation, the recording sheets S are aligned and then shifted as they are stacked on the tray, in other words, a stacked area (tray) of the recording sheets S to be discharged is shifted before discharging the recording sheets to one of the first to eighth sheet discharge bins 251 to 258. In addition, the stapler has a staple residue detecting sensor which is not shown to detect the residue of the staples stored in the stapler.

The sorter option unit 108 is controlled by the sorter controller 108a.

The option controller unit 106, the paper deck controller 107a, and the sorter controller 108a are connected to each other with connectors for a serial communication using the option unit interface 70. Both are connected to each other with the same connectors in serial, and therefore the paper deck option unit 107 and the sorter option unit 108 can be replaced with each other in the connection order in the connection.

In the downstream of the manual feed roller 203, the cassette sheet feed clutch 231, and the paper deck sheet feed roller 242 there are provided the registration roller pair 205 for carrying the recording sheet S, the sheet feed roller 204, and the carrying roller 244, and in the downstream of the registration roller pair 205 there is provided the image recording unit 207 for forming a toner image on the recording sheet S by means of laser beams emitted from the laser scanner unit 206. Furthermore, in the downstream of the image recording unit 207 there is provided the fixing unit 208 for thermally fixing the toner image formed on the recording sheet S, and in the downstream of the fixing unit 208 there are provided the sheet discharge sensor 209 for detecting a carriage state of the sheet discharge unit, the carrying roller 210 for carrying the recording sheet, and the flapper 211 for changing the carriage direction of the recording sheet S completed to be recorded.

Figure 11:
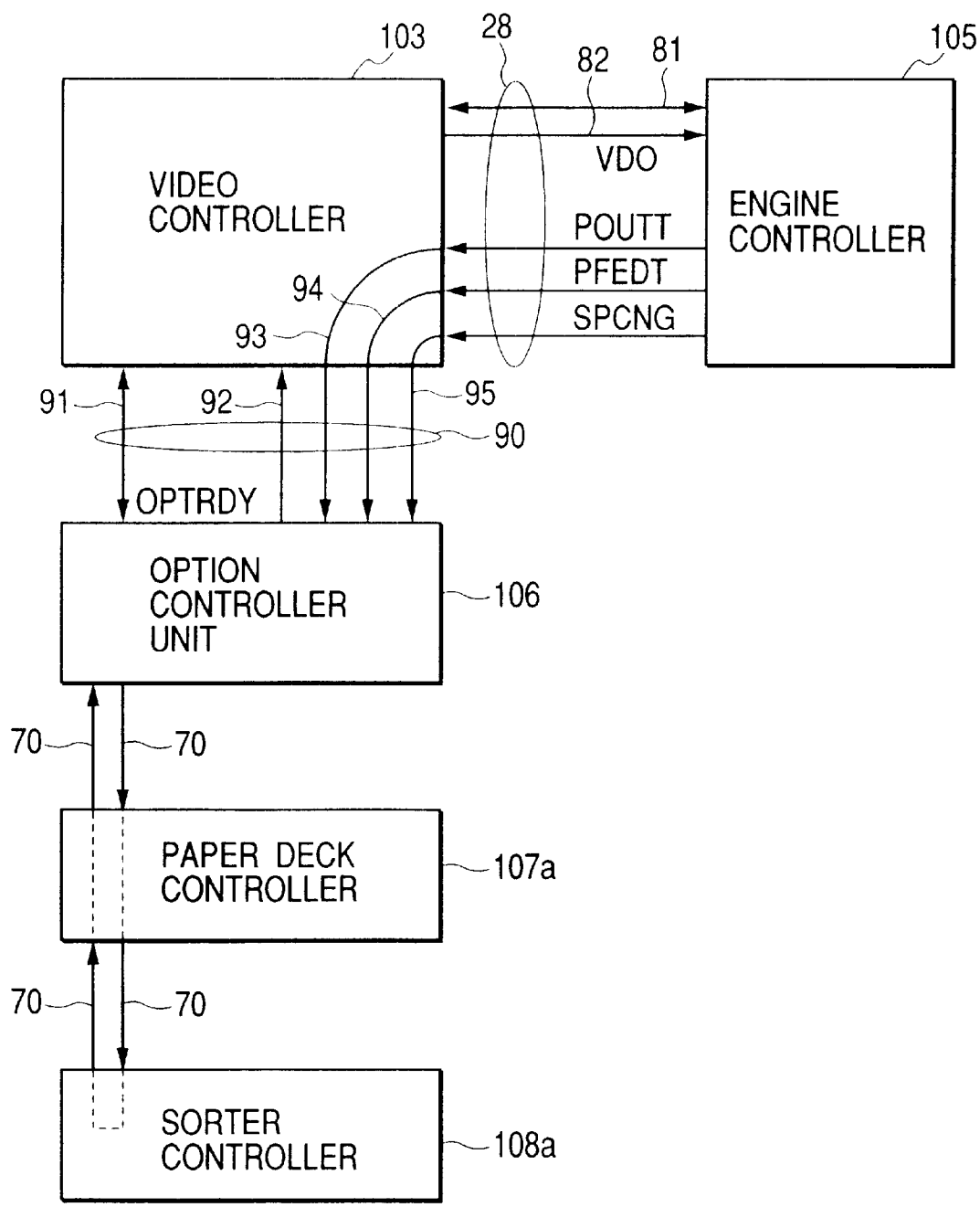
FIG. 11 is a block diagram of assistance in explaining the constitution of the printer shown in FIG. 9.

Referring to FIG. 11, there is shown a block diagram of assistance in explaining a constitution of the printer 102 shown in FIG. 9. The same reference characters are appended to the same parts as for those in FIG. 9.

In this diagram, a reference numeral 91 designates a serial communication interface, through which a command of the sheet feed designation to the paper deck option unit 107 or of the sheet discharge bin designation to the sorter option unit 108 is transmitted from the video controller 103 to the option controller unit 106, and various states such as the sheet presence/absence state of the paper deck option unit 107, stacking states of respective sheet discharge bins of the sorter option unit 108, and the staple presence/absence state are transmitted. The option controller unit 106 can be directly connected to the video controller 103 with the CPU bus.

An OPTRDY signal 92 functions as a signal indicating whether or not an option designated by the video controller 103, for example, stapling is ready and it is transmitted from the option controller unit 106 to the video controller 103. A POUTT signal 93 functions as a timing signal indicating a timing when the printer 102 body discharges the recording sheet. A PFEDT signal 94 functions as a signal indicating a timing when the printer 102 body receives the recording sheet from the option unit. An SPCNG signal 95 functions as a signal for decreasing the speed of the recording sheet S which has been carried at a high speed in the option unit to be matched to the carrying speed of the printer 102 body.

A reference numeral 81 designates a communication interface, through which a command of the sheet feed designation to the sheet feed cassette of the printer 102 body or of the sheet discharge designation to the sheet discharge tray 231 of the printer 102 body, a printing command or the like is transmitted from the video controller 103 to the engine controller 105 and states such as the sheet presence/absence state of the cassette 230 of the printer 102 body and a sheet jam are transmitted from the engine controller 105 to the video controller 103. A VDO signal 82 indicates bit data to be transmitted from the video controller 103.

Other controls for processing with the engine controller 105 are executed on the basis of signals transmitted or received to or from the video controller 103, while the signals are not shown; there are /CPRDY, /PPRDY, /RDY, /PRNT, /VSREQ, /VSYNC, /BD, /SCLK, /CMD, /CBSY, /STS, /SBSY, /CCRT (condition change report) signals, whose details are as shown in FIG. 12.

Referring to FIG. 12, there is shown a diagram of assistance in explaining the signals transmitted or received between the video controller (VC) 103 and the engine controller (EC) 105.

A method of using the /CCRT signal among the above signals is described in the following procedure 1 and procedure 2.

(Procedure 1)

The video controller 103 generally checks the /RDY signal and the /CCRT signal and it reads status information if any change occurs in these signals. At this time, if the /CCRT signal is false and the /RDY signal becomes false, a status check is executed for contents of misprinting, wait, sleep, and operator call or the like and details are confirmed by referring to lower statuses corresponding to each bit according to the result.

(Procedure 2)

On the other hand, if the /CCRT signal becomes true, the video controller 103 reads the statuses of such contents as a sheet size change, a sheet feed unit sheet presence/absence change, a sheet feed unit function change, and an alarm content change, recognizes the types of the changed statuses, and reads the statuses of the group sequentially to recognize the details. Regarding a reset procedure of the /CCRT signal, the engine controller 105 always checks status changes at the end of the processing, in other words, a sheet size change, a sheet presence/absence change, a sheet feed unit function change, an alarm state change; if any change occurs, the engine controller sets the state change status corresponding to an upper status to 1 and causes the /CCRT signal which is a hard signal to be true. After that, the engine controller 105 receives a status request command from the video controller 103 and then causes the /CCRT signal to be false when the state change status is read by the video controller 103.

The integrating interface 90 comprises five hard signals; a serial communication interface 91, an OPTRDY signal 92, a POUTT signal 93, a PFEDT signal 94, and an SPCNG signal 95.

The POUTT signal 93, the PFEDT signal 94, and the SPCNG signal 95 are output from the engine controller 105 and then inputted to the option controller unit 106 via the video interface 80 and through the video controller 103. The details of the above signals are as shown in FIG. 13.

Referring to FIG. 13, there is shown a diagram of assistance in explaining signals exchanged among the video controller (VC) 103, the engine controller (EC) 105, and the option controller (OC) unit 106.

Figure 14:
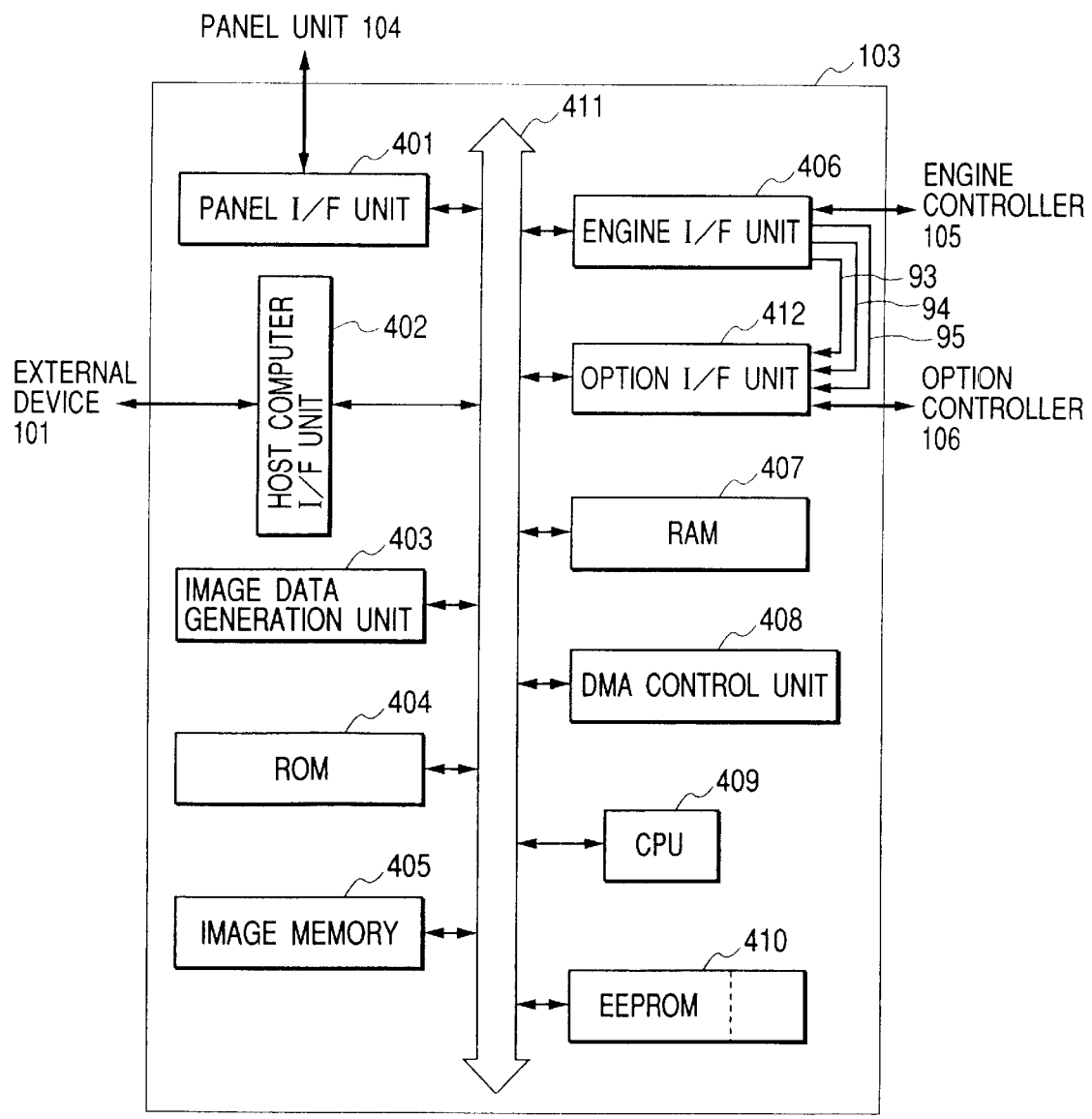
FIG. 14 is a block diagram of assistance in explaining a constitution of the video controller shown in FIG. 9.

Referring to FIG. 14, there is shown a block diagram of assistance in explaining a constitution of the video controller 103 shown in FIG. 9, and the same reference characters are appended to the same parts as for those in FIG. 9.

In this diagram, a panel interface (I/F) unit 401 receives various settings or instructions from an operator by means of data communication with the panel unit 104. A host interface (I/F) unit 402 is an input-output unit of signals to or from the external device 101 such as a host computer. An engine interface (I/F) unit 406 is an input-output unit of signals to or from the engine controller 105, transmitting data signals from an output buffer register which is not shown and controlling communications with the engine controller 105.

An image data generation unit 403 generates bit map data for actual printing on the basis of control code data transmitted from the external device 101. An image memory 405 stores image data.

A CPU 409 controls the entire video controller 103. A ROM 404 stores control codes of the CPU 409. A RAM 407 functions as a temporary storage means used by the CPU 409. An EEPROM 410 comprises a nonvolatile memory medium.

A DMA control unit 408 transfers bit map data in the image memory 405 to an engine interface unit 406 according to an instruction from the CPU 409. An option interface (I/F) unit 412 communicates with the option controller unit 106 according to an instruction from the CPU 409. In addition, it transmits POUTT signal 93, the PFEDT signal 94, the SPCNG signal 95 through the engine interface unit 406 to the integrating interface 90.

A system bus 411 has an address bus and a data bus. The panel interface unit 401, the host interface unit 402, the image data generation unit 403, the ROM 404, the image memory 405, the engine interface unit 406, the RAM 407, the DMA control unit 408, the CPU 409, the EEPROM 410, and the option interface unit 412 are connected to the system bus 411 and they have access to all the function units on the system bus 411.

The control codes for controlling the CPU 409 are assumed to be composed of an OS for time sharing controls in units of a load module named task by a system clock which is not shown and a plurality of load modules (tasks) operating in units of a function.

With the above constitution, the video controller 103, having a plurality of sheet feed/discharge ports, controls handling of the recording medium for feeding or discharging sheets to the printer 102 capable of recording an image on the recording medium on the basis of the printing information inputted from the external device 101.

By referring to FIGS. 15, 16A and 16B, a description will be given below about a control method in which the video controller 103 integrates and controls respective option devices through the option controller unit 106.

Referring to FIG. 15, there is shown a typical diagram of a shared memory with the video controller 103 secured in the RAM installed in the option controller unit 106 shown in FIG. 9.

The shared memory shown in FIG. 15, which is used for a page designation, comprises a carrying condition management area for teaching a carrying condition of sheets, a basic status part for teaching an abnormal state of each option, a command status part for exchanging a command status, and a start-up processing part for designating start-up processing of an option device.

The start-up processing part comprises a start-up designation part for designating the start-up from the video controller 103 and an end notification part for notifying an end of each option processing as a result of the designation.

The video controller 103 makes designation in this start-up processing part to execute the start-up processing of various options or the like. When a power supply is turned on, the video controller 103 informs the start-up designation part of an initialization designation for the shared memory, a configuration information acquirement designation of each option required by the option controller unit 106, or an end of an information acquirement, observes the end notification part to check that each processing is completed, and terminates the start-up processing if all ends.

The carrying condition management area comprises a part where a printing method is designated to option such as a sheet feed port, a sheet discharge port, color/monochrome, or stapling position and execution and a part which teaches option state; How much sheet feed ended?, Can print signal be output?, Does sheet discharge end?, for example. The video controller 103 designates the above printing methods and executes the printing with grasping the respective option states.

The above designations of the maximum 40 pages is possible and the designation is made in order for each page. An area for which the sheet discharge is completed is assumed to be a space area and initialized so that it can be used for designation again before being used as a ring buffer.

The basic status part is an area for teaching an abnormal state of each device, so as to acquire states such as no sheet, a sheet size inconsistency, door open, a sheet jam, a breakdown, full stacking, and no staple from this area. Based on the content of the basic status, further detailed information is acquired according to a command status.

The command status part is an area for acquiring detailed information of each option and controlling the option operation. A command required for this area is designated to acquire the information. For example, acquirable information is a device name, a feed mounting sheet size, a fed sheet residue, a sheet jam position, a type, an access point, a stacking quantity of discharged sheets, or details of a breakdown. These statuses can be acquired by issuing a command according to each condition as shown in FIGS. 16A and 16B described later. Additionally, the command status part is used for controlling options such as a shift to a saving power mode, an emergency stop at a sheet jam, moving a sheet discharge bin, and a reset execution.

Figure 16A:
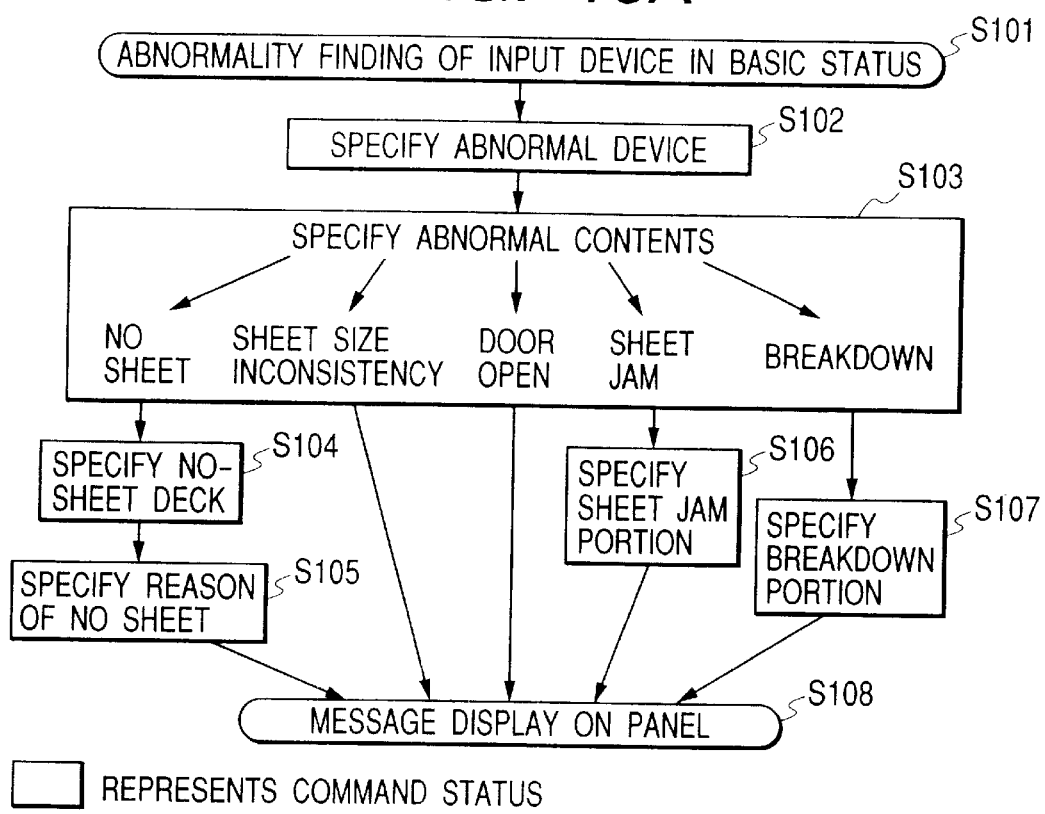
FIGS. 16A and 16B are flow charts showing a third processing procedure of an image recording system to which are applicable the data processing apparatus and the image recording apparatus of the present invention.
Figure 16B:
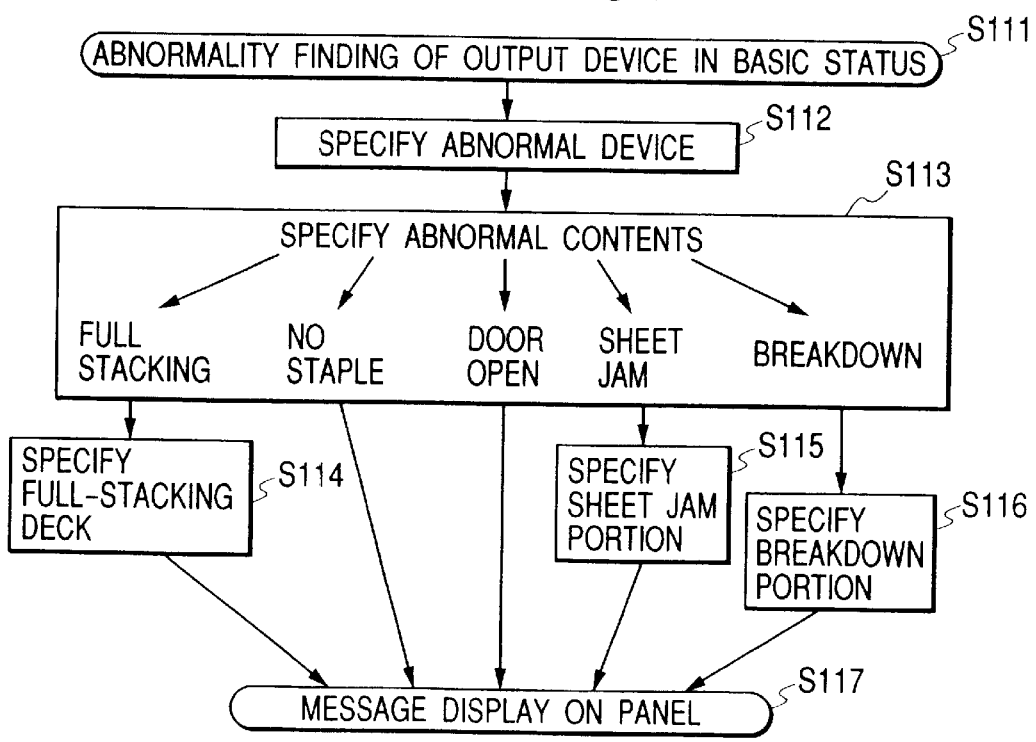

Referring to FIGS. 16A and 16B, there are shown flow charts of the third processing procedure of an image recording system to which the data processing apparatus and the image recording apparatus of the present invention are applicable, corresponding to the procedure in which the video controller 103 shown in FIG. 9 issues a command status based on the basic status to acquire the detailed information of each input or output option. The CPU 409 in the video controller 103 shown in FIG. 13 executes the procedure based on the program stored in the ROM 404. FIG. 16A shows a procedure used when an abnormality of an input device is found and FIG. 16B shows a procedure used when an abnormality of an output device is found. S101 to S108 and S111 to S117 designate steps.

First, as shown in FIG. 16A, the video controller 103 designates a command in the command status part when detecting an abnormality of an input device from the basic status part of the shared memory shown in FIG. 15 (S101) and specifies an abnormal device (which input device if a plurality of input option devices are connected)(S102).

Furthermore, it designates a command in the command status part and specifies abnormal contents (no sheet, sheet size inconsistency, door open, sheet jam, breakdown, etc.) (S103).

Next, it designates a command according to the specified abnormal content; for example, it specifies no sheet deck (S104) and a reason of no sheet (S105) for no sheet, specifies a sheet jam portion (S106) for a sheet jam, or specifies a breakdown portion for a breakdown (S107).

Then, a message indicating the abnormal content acquired by the above command is displayed on the panel unit 104, the operator unit 107b, and a display unit of the external device 101.

As shown in FIG. 16B, the video controller 103 designates a command in the command status part when detecting an abnormality of an output device from the basic status part of the shared memory shown in FIG. 15 (S111) and specifies an abnormal device (which output device if a plurality of output option devices are connected)(S112).

Furthermore, it designates a command in the command status part and specifies abnormal contents (full stacking, no staple, door open, sheet jam, breakdown, etc.)(S113).

Next, it designates a command according to the specified abnormal content; for example, it specifies full stacking deck (S114) for full stacking, specifies a sheet jam portion (S115) for a sheet jam, or specifies a breakdown portion for a breakdown (S116).

Then, a message indicating the abnormal content acquired by the above command is displayed on the panel unit 104, the operator unit 107b, and the display unit of the external device 101.

In this manner, the video controller 103 acquires the above information, executes printing in no abnormal state, issues a command status for specifying an abnormal portion when detecting an occurrence of an abnormality from the basis status part, further specifies an abnormal content for the device, and then collects and controls detailed information according to the abnormality.

Figure 17:
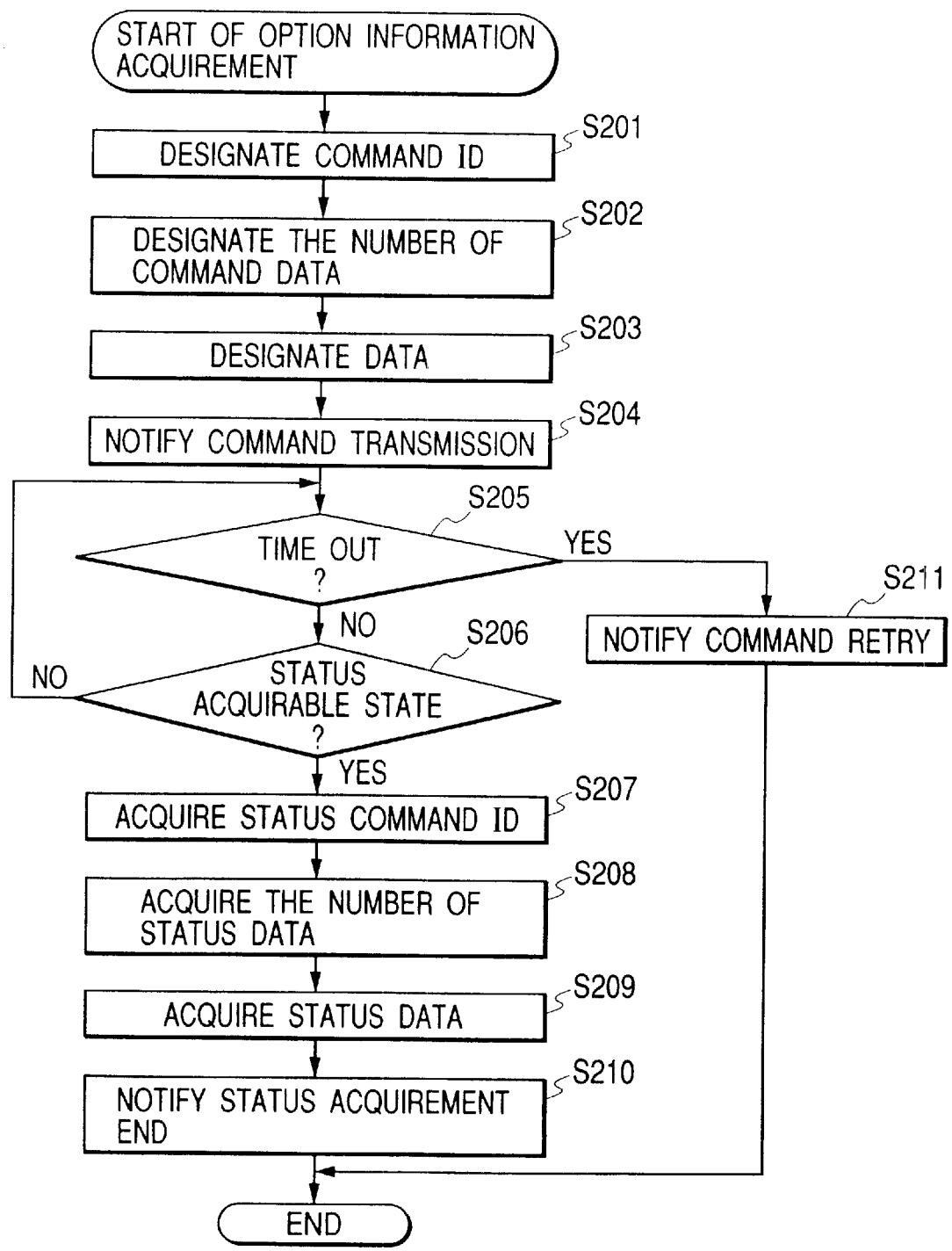
FIG. 17 is a flow chart showing a fourth processing procedure of an image recording system to which are applicable the data processing apparatus and the image recording apparatus of the present invention.

Referring to FIG. 17, there is shown a flow chart of a fourth processing procedure of an image recording system to which the data processing apparatus and the image recording apparatus of the present invention are applicable, corresponding to the procedure in which the video controller 103 shown in FIG. 9 accesses to the shared memory of the option controller unit 106 and exchanges a command status with each option for transmitting or receiving information. The CPU 409 in the video controller 103 shown in FIG. 14 executes the procedure based on the program stored in the ROM 404. S201 to S211 designate steps.

To acquire option information, a designation is made for the command status management area in the memory in the option controller unit 106 to receive the information. An ID for discriminating a type of required information is designated at a predetermined address in the command designation area (S201), the number of data to be designated for the option controller unit 106 using an execution command is designated at a predetermined address (S202), and data representing the contents of the designation is designated at a predetermined address (S203).

Then, a command transmission is notified and the option controller unit 106 triggers an acquirement of information by making a communication with each option device (S204).

The option controller unit 106 performs a serial communication with required option devices on the basis of the trigger in step S204 and the designation contents to acquire the designated information. On the other hand, a timer is started until the option controller unit 106 completely acquires the information to observe whether or not the video controller 103 is in a status information acquirable state (S205, S206).

Unless the video controller 103 shifts to the status information acquirable state in step S206 after an elapse of a certain period of time in step S205, the status information cannot be acquired and therefore a retry is notified to execute the command again (S211) before terminating the processing.

On the other hand, after the video controller 103 shifts to the status information acquirable state in step S206 before the certain period of time is elapsed in step S205, a status ID is acquired and the image recording system checks that it is status information for the designated command (S207).

Next, the system acquires the number of status data (S208), acquires status data of the number of status data (S209), notifies the status acquirement end to the option controller unit 106 (S210), and terminates the processing.

By referring to FIGS. 18 to 21, a description will be given below about a data flow from the external device 101 to the option controller unit 106 and the engine controller 105 shown in FIG. 9.

Figure 18:
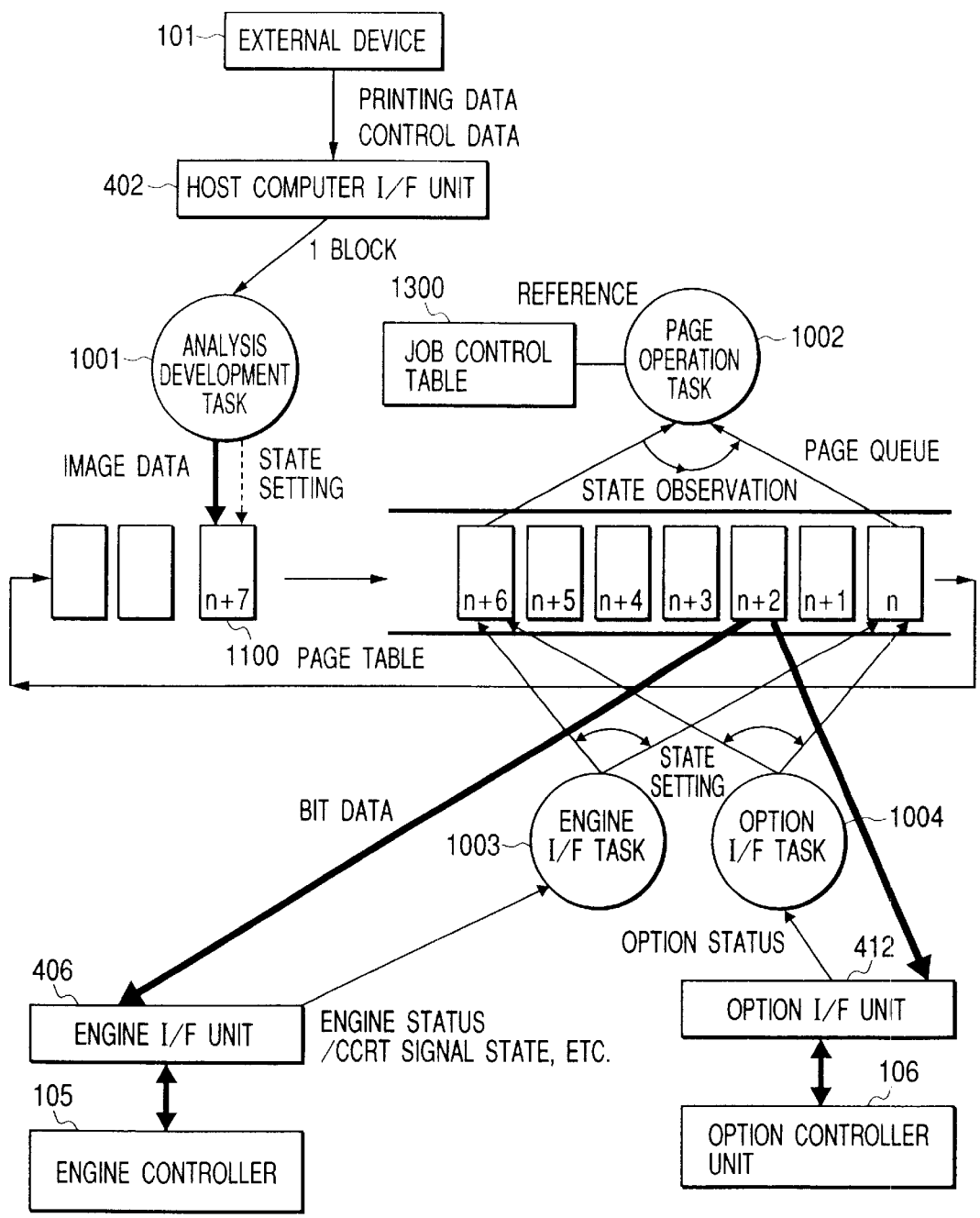
FIG. 18 is a diagram showing a data flow from an external apparatus shown in FIG. 9 to the option controller unit and the engine controller unit.

Referring to FIG. 18, there is shown a diagram of the data flow from the external device 101 to the option controller unit 106 and the engine controller 105 shown in FIG. 9.

The control code for controlling the CPU 409 of the video controller 103 shown in FIG. 14 is assumed to comprise of an OS for a time sharing control in units of a load module named a task with a system clock which is not shown and a plurality of load modules operating in units of a function.

A translator processing system (analysis development task 1001), a scheduling system (page operation task 1002), an engine I/F system (engine I/F task 1003), and an option I/F system (option I/F task 1004) shown in FIG. 18 are tasks whose entity exists in the CPU 409 as described in the above and are assumed to operate in parallel logically.

Figure 19:
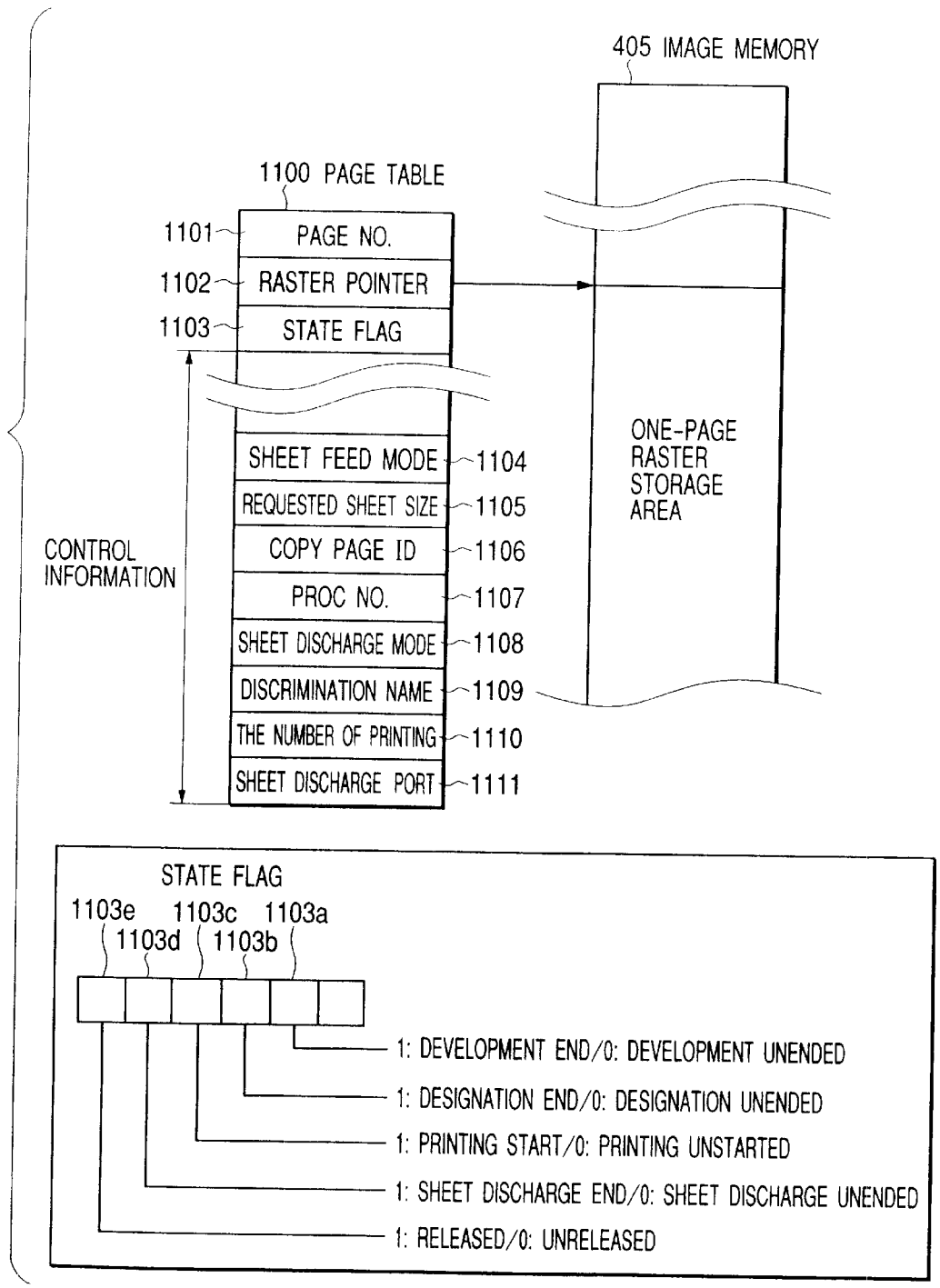
FIG. 19 is a diagram showing a structure of a page table stored in the RAM shown in FIG. 14.

Referring to FIG. 19, there is shown a diagram of a structure of a page table stored in the RAM 407 shown in FIG. 14.

In this diagram, a page table 1100 stores page information. The page table 1100 is used for recognizing each page logically in the CPU 409. The page table 1100 comprises "page No." 1101, "raster pointer" 1102, "state flag" 1103, . . . , "sheet feed mode" 1104, "requested sheet size" 1105, "copy page ID" 1106, "processing No." 1107, "sheet discharge mode" 1108, "discrimination name" 1109, "the number of printed copies" 1110, "sheet discharge port" 1111, or the like, and its entity exists as a continuous area in a control information storage area which is not shown in the RAM 407 shown in FIG. 14 and it can be acquired by a page management function part which is not shown or the CPU 409, so that its release is managed thereby.

The "raster pointer" 1102 in the page table 1100 is a head pointer for a one-page area in the image memory 405 shown in FIG. 14 and the CPU 409 divides the corresponding area which is not shown in the image memory 405 in units of a page for linking to this pointer at a power-on initialization.

In addition, the "state flag" 1103 is an area for storing flags indicating page states, such as "development end flag" 1103*a* for indicating a development end/unended state, "page designation end flag" 1103*b* for indicating a page designation end/unended state, "printing start flag" 1103*c* for indicating a page printing start/unstarted state, "sheet discharge end flag" 1103*d* for indicating a page discharge end/unended state, and "release flag" 1103*e* for indicating a page information development area released/unreleased state. Based on these state flags, it is possible to judge the state of generated page information.

Furthermore, the "sheet feed mode" 1104 is used for specifying a determination method of the sheet feed means, and there are various types of modes such as "automatic sheet feed", "cassette 1 (cassette 230) sheet feed", "paper deck (sheet feed option 107) sheet feed", and "MP tray (manual feed sheet tray 202) sheet feed" and the "automatic sheet feed" is a mode for starting a retrieval and a determination from a sheet feed means on which sheets are stacked having a matched sheet size in accordance with a predetermined priority.

An area "requested sheet size" 1105 is used for storing a numeric representation of a sheet size with which a sheet feed operation is requested to the engine controller 105.

Additionally an area "discrimination name" 1109 is used for storing a numeric indicating a character string representing a sheet discharge port name of a sheet discharge destination. An area "the number of printing" 1110 is used for storing a numeric indicating the number of printed copies. In an area "sheet discharge port" 1111 is used for storing a numeric representing a sheet discharge port of a sheet discharge destination.

Figure 20:
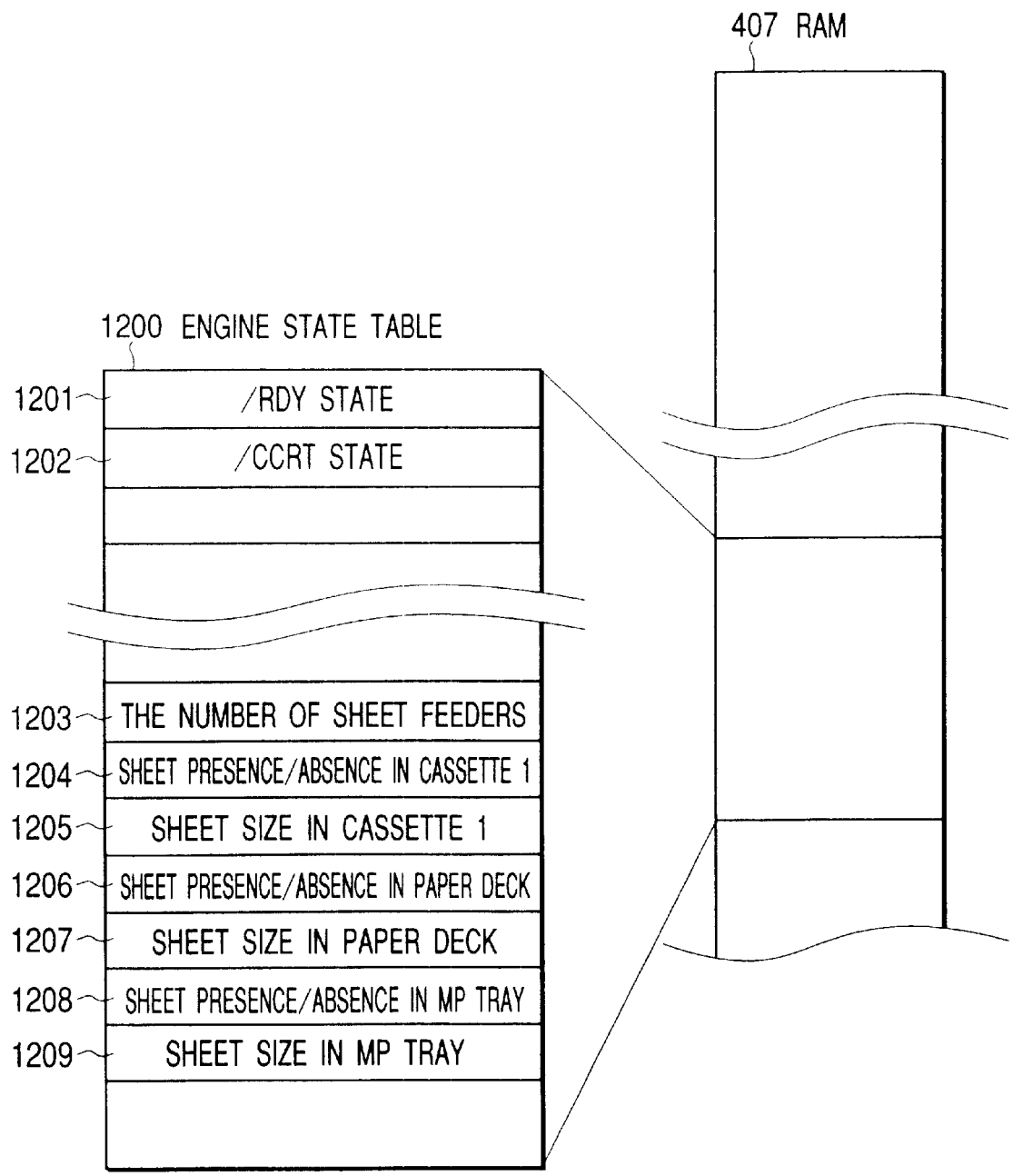
FIG. 20 is a diagram showing a structure of an engine state table stored in the RAM shown in FIG. 14.

Referring to FIG. 20, there is shown a diagram of a structure of the engine state table stored in the RAM 407 shown in FIG. 14.

In this diagram, an engine state table 1200 indicates states of the engine controller 105 and options (106, 107 and 108) managed by the video controller 103 and comprises "/RDY state" 1201, "/CCRT state" 1202, . . . , "the number of sheet feeders" 1203, "sheet presence/absence in cassette 1" 1204, "sheet size in cassette 1" 1205, "sheet presence/absence in paper deck" 1206, "sheet size in paper deck" 1207, "sheet presence/absence in MP tray" 1208, and "sheet size in MP tray" 1209. These states are not the same as actual states of the engine controller 105 and the options (106, 107 and 108), but states of the engine controller 105 and the options (106, 107 and 108) are reflected on them and updated by means of a predetermined communication at an arbitrary timing.

For example, the "/RDY state" 1201 flag reflects a state of the /RDY signal shown in FIG. 12 and it is "true" while a "false" state of the /RDY signal is detected in the engine I/F task.

The "/CCRT state" 1202 flag reflects a state of the /CCRT signal shown in FIG. 12 and reflects the actual state of the /CCRT signal with the engine I/F task. With a detection of the "true" of the /CCRT signal in the engine I/F task and an acquirement of the state of the engine controller 105 in a predetermined serial communication, the /CCRT signal becomes "false" as described above.

Furthermore, "the number of sheet feeders" 1203 reflects an installation of an option cassette unit and the number of sheet feeders can be selected.

In addition, "sheet presence/absence in cassette 1" 1204 indicates a presence or an absence of sheets in the cassette 230. Furthermore, "sheet size in cassette 1" 1205 indicates a sheet size set by a dial which is not shown of the cassette 230 and it is recognized as a sheet size of the cassette 230 on the assumption that an operator stacks sheets having the same size as one indicated by a dial value.

Additionally, "sheet presence/absence in paper deck" 1206 indicates a presence or an absence of sheets in the sheet feed option device 107. "sheet size in paper deck" 1207 indicates a sheet size set by using a divider of the sheet feed option device 107 which is not shown and it is recognized as a sheet size of the sheet feed option device 107 on the assumption that an operator stacks sheets having the same size as one indicated by a divider value.

"Sheet presence/absence in MP tray" 1208 indicates a presence or an absence of sheets in the manual feed tray 202. "sheet size in MP tray" 1209 indicates a sheet size of the manual feed tray 202 detected by a sensor which is not shown.

Both of the page table shown in FIG. 19 and the engine state table (not shown in FIG. 18) shown in FIG. 20 are referenced and updated from the analysis development task, the page operation task, the engine I/F task, and the option I/F task.

Figure 21:
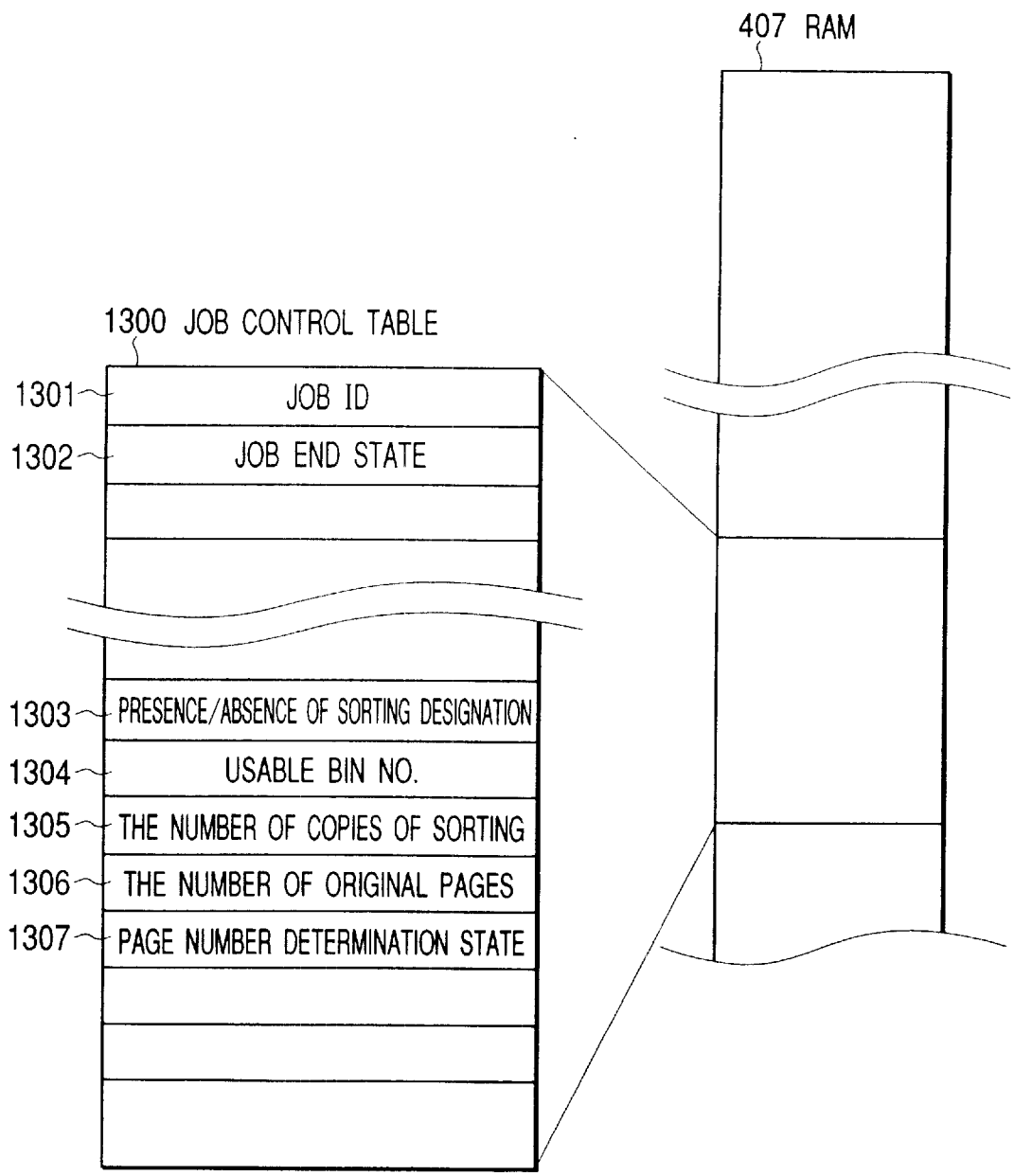
FIG. 21 is a diagram showing a structure of a job control table stored in the RAM shown in FIG. 14.

Referring to FIG. 21, there is shown a structure of the job control table stored in the RAM 407 shown in FIG. 14.

In this diagram, a job control table 1300 is used for controlling jobs in the CPU 409. The job control table 1300 comprises "job IF" 1301, "job end state" 1302, . . . , "presence/absence of sorting designation" 1303, "usable bin No." 1304, "the number of copies of sorting" 1305, "the number of original pages" 1306, and "page number determination state" 1307. Its entity exists as a continuous area in a control information storage area which is not shown in the RAM 407 shown in FIG. 13 and its acquirement or release is managed by the CPU 409.

The data flow in FIG. 18 is described below.

Referring to FIG. 18, printing data (control code, PDL, etc.) inputted from the external device 101 is stored in units of a predetermined block in the host interface unit 402.

In the "analysis development task" 1001, the page table 1100 shown in FIG. 19 is acquired when data is detected in the host I/F unit 402. Then, data is analyzed in units of a block as described above and an image is developed using the image data generation unit 403 shown in FIG. 13 or by the CPU 409 itself and then stored in an area indicated by the "raster pointer" 1102 in the page table 1100 shown in FIG. 19 regarding image forming information (a PDL graphic drawing instruction, a character code, etc.).

The control information (the number of copies, a sheet feed selection, etc.) for the printer is stored in the page table 1100 shown in FIG. 19. After the end of one-page data analysis and development, the "development end flag" in the "state flag" is caused to be true and enqueued to a page queue (for example, provided in the image memory 405 or the EEPROM 410) having an FIFO structure.

In the "page operation task" 1002, the job control table 1200 shown in FIG. 21 is referenced, the "state flags" 1103 in all the page tables 1100 in the page queue described above are simultaneously observed, and a carrying procedure is changed according to the state to execute the printing.

At this time, the option I/F unit 412 is used to make printing designations such as a sheet feed means, sheet discharge means, and a printing mode an the engine I/F part 406 is used to actually make settings such as a sheet feed means for the engine controller 105. The page table 1100 whose "sheet discharge end flag" 1103c becomes true is dequeued from the page queue and then returned to a page management function unit which is not shown.

In the "engine I/F task" 1003 and the "option I/F task" 1004, communications are made with the engine controller 105 and the option controller unit 106 at predetermined periods via the engine I/F unit 406 and the option I/F unit 412; in case of an occurrence of any reason of changing the page state, the above "state flag" 1103 is updated.

In addition, whether the /RDY signal has any change is observed; the printer state is considered to be an error occurrence for a change from TRUE to FALSE in the /RDY signal and whether the error is removed is observed. Furthermore, any changes in the /RDY signal, the /CCRT signal, and other states are observed and the above Procedure 1 and Procedure 2 are executed to update the "engine state table" 1200 shown in FIG. 13.

An operation mode designation (the number of copies, sheet feed selection, etc.) from the panel unit 104 is once stored in the panel I/F unit 401. In a printer control task which is not shown, the panel I/F part 401 is circulated through for observation at appropriate intervals; if data exists, it is stored in the EEPROM 410 and at the same time stored as control information in the control information storage area which is not shown in the RAM 407. With this data storage in the EEPROM 410, the printer can be operated in a mode desired by a user after the power supply of the printer is set off once.

By referring to FIG. 22, a description will be given below about processing in which the image recording apparatus 102 receives printing data from the external device such as a host computer and completes the printing.

Figure 22:
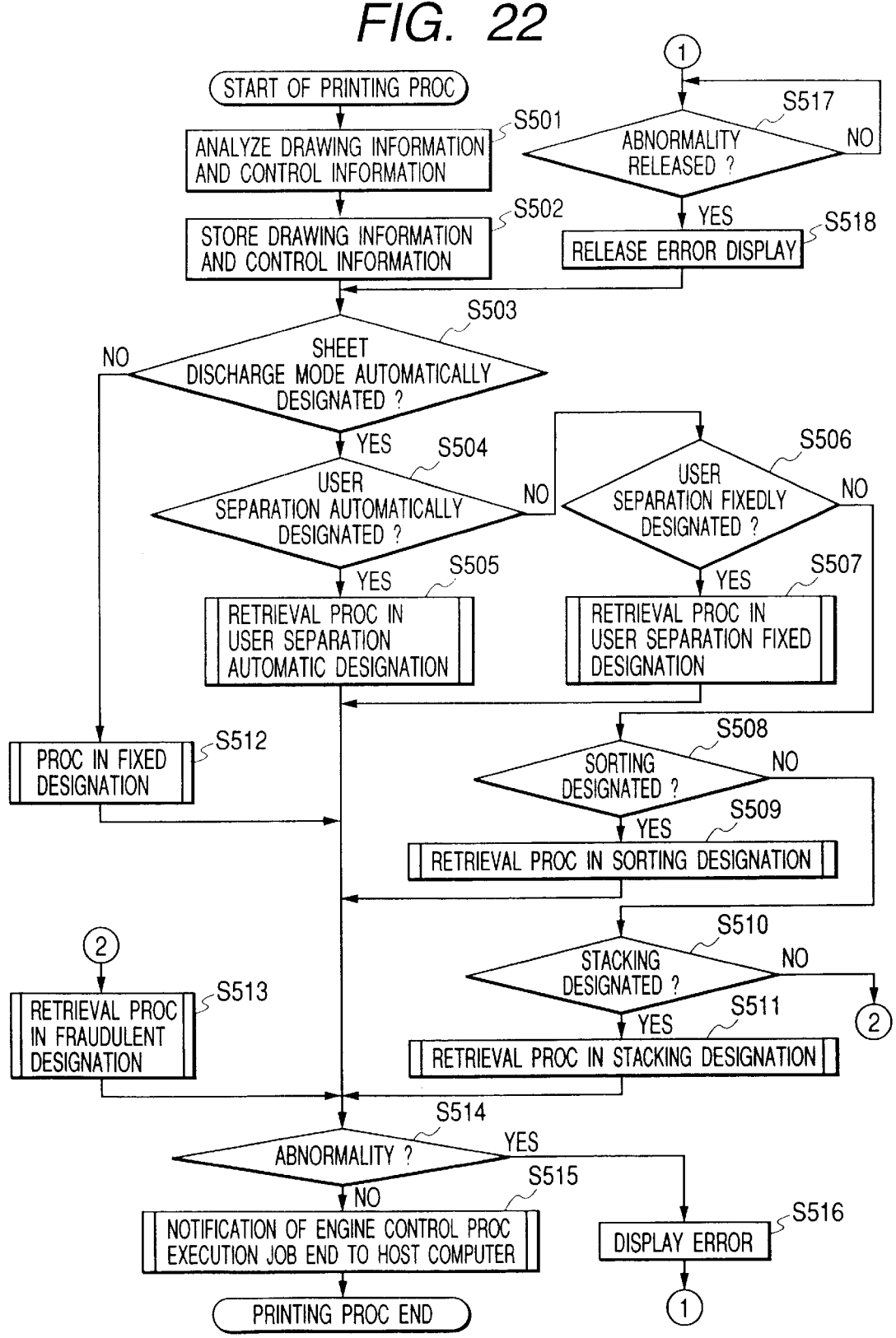
FIG. 22 is a flow chart showing a fifth control processing procedure of an image recording system to which are applicable the data processing apparatus and the image recording apparatus of the present invention.

Referring to FIG. 22, there is shown a flow chart of a fifth control processing procedure of an image recording system to which the data processing apparatus and the image recording apparatus of the present invention are applicable, the flow chart corresponding to processing in which the image recording apparatus 102 receives printing data from the external device 101 such as a host computer and completes the printing. The CPU 409 shown in FIG. 14 executes these operations based on programs stored in the ROM 404 or in other storage mediums not shown. S501 to S518 indicate steps.

First, in step S501, printing data (control information and drawing information) transmitted form the external device 101 such as a host computer is analyzed. In step S502 the control information is stored in the memory (RAM 407) and the drawing information is developed and stored in the memory (RAM 407). In step S503, it is judged whether or not the sheet discharge mode is the automatic designation based on the control information stored in the memory; if it is judged that the mode is not the automatic designation, a fixedly designated sheet discharge port is selected based on the control information as processing in a fixed designation in step S512 and then the control progresses to step S514.

On the other hand, if the sheet discharge mode is judged to be the automatic designation based on the control information in step S503, it is judged whether or not the user separation automatic mode is designated in step S504; if the user separation automatic mode is judged to be designated, a retrieval processing (shown in FIG. 23 described later) in a user separation automatic designation is executed in step S505 and then the control progresses to step S514.

On the other hand, unless the user separation automatic mode is designated in step S504, it is judged whether or not the user separation fixed mode is designated in step S506; if the user separation fixed mode is judged to be designated, retrieval processing in a user separation fixed designation is executed in step S507 and then the control progresses to step S514.

On the other hand, unless the user separation fixed mode is designated in step S506, it is judged whether or not sorting is designated in step S508; if sorting is judged to be designated, retrieval processing in a sorting designation is executed in step S509 and then the control progresses to step S514.

On the other hand, unless sorting is judged to be designated in step S508, it is judged whether or not stacking is designated in step S510; if stacking is judged to be designated, retrieval processing in the stacking designation is executed in step S511 and then control progresses to step S514.

On the other hand, unless stacking is designated in step S510, retrieval processing in a fraudulent designation is executed in step S513 and then the control progresses to step S514.

Next, in step S514 a stacking state or other information stored in the EEPROM 410 and respective sensors or the like which are not shown are checked to judge whether or not there is any abnormality such as full stacking; if it is judged that there is no abnormality, engine control processing (printing processing) is executed in step S515, a sheet discharge bin having a discrimination name designated in the printing job is transmitted to the host computer after all of the sheet discharge of the printing job is completed, and then a user is notified of the bin to which the sheet is currently discharged on the UI of the host computer (and/or the bin is displayed on the display part of the panel unit 104 shown in FIG. 9) before terminating the printing processing. In the printing processing executed when the user separation automatic mode is designated, printed sheets are discharged to respective sheet discharge ports determined by user separation automatic retrieval processing shown in FIG. 23 described later by the number of copies which has been determined for each.

On the other hand, if it is judged that there is abnormality (for example, an abnormality of full stacking) in step S514, an error is displayed according to a content of the abnormality in the panel unit 104 of the image recording apparatus 102 and the host computer 101 is notified of the content of the abnormality and of an event of the error display in step S516, and then a removal of the abnormality with an operation of the user (for example, removing printed sheets from the full-stacked bin) is awaited in step S517; if it is judged that the abnormality is removed (for example, in response to a state change of the bin from a stacking state to a vacant state caused by a user removing the printed sheets from the bin in the stacking state and a confirmation of the change as a result of detecting a sheet stacking quantity from the sensor). In step S518 the panel unit 104 is released from the error display and the host computer 101 is notified of an event of the error display release to restart the processing form step S503 for entering recovery processing.

By referring to FIG. 23, sheet discharge port retrieval processing in the user separation automatic mode is described below.

Figure 23:
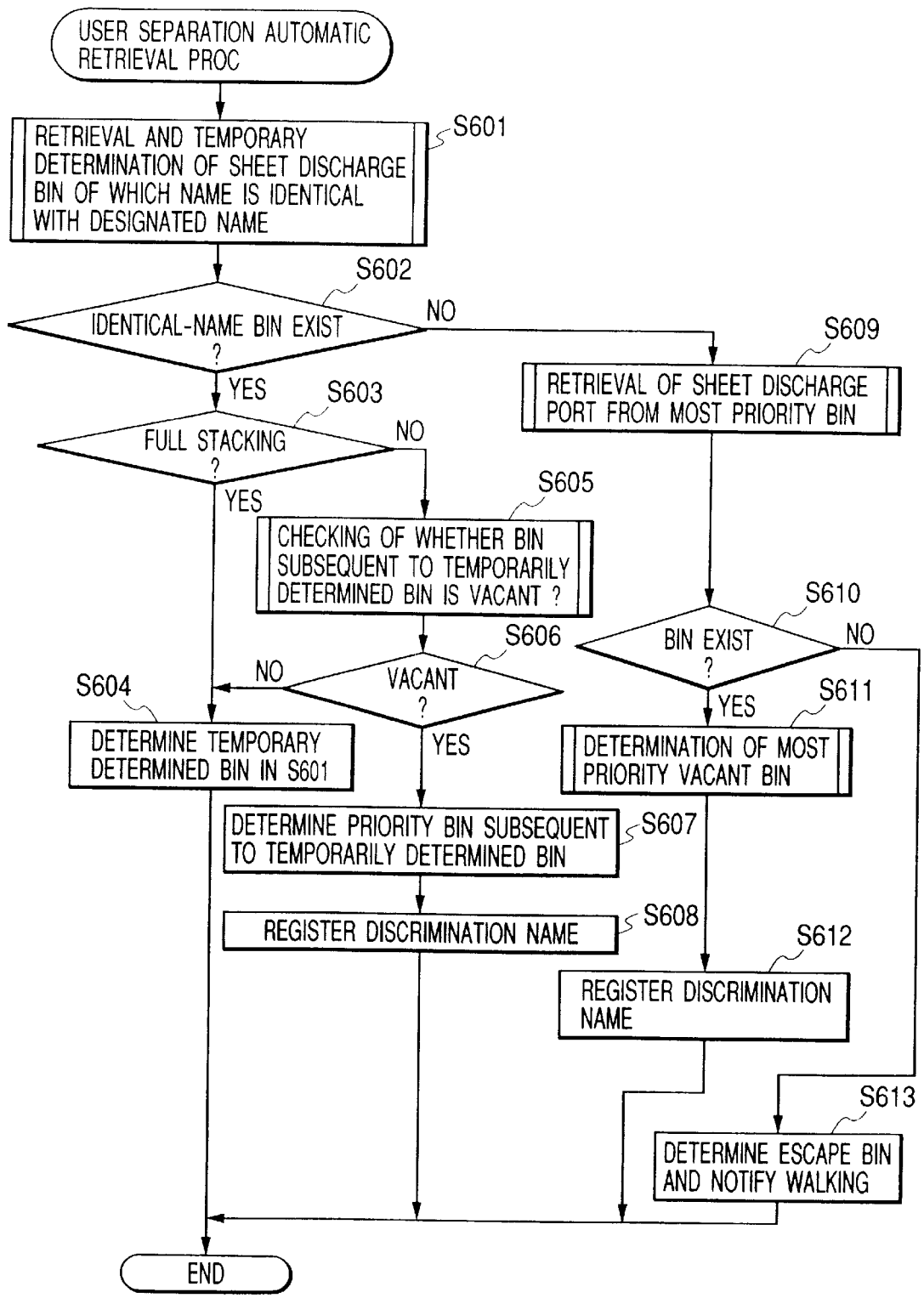
FIG. 23 is a flow chart showing a sixth control processing procedure of an image recording system to which are applicable the data processing apparatus and the image recording apparatus of the present invention.

Referring to FIG. 23, there is shown a flow chart of a sixth control processing procedure of an image recording system to which the data processing apparatus and the image recording apparatus of the present invention are applicable, corresponding to the sheet discharge port retrieval processing in the user separation automatic mode (retrieval processing in the user separation automatic designation in step S505 shown in FIG. 22); the CPU 409 shown in FIG. 14 executes the procedure based on programs stored in the ROM 404 or other storage mediums not shown. Steps S601 to S613 indicate steps.

After a start of the user separation automatic retrieval processing, first, a retrieval processing is performed for a sheet discharge bin having the same name as a discrimination name designated in the printing data in step S601; if there is a sheet discharge bin having the same name registered in the EEPROM 410 shown in FIG. 14, the bin is assumed to be a temporarily determined bin. At this time, the retrieval is started from a bin having a lower priority and if there are plurality of lower priority bins, a bin having the lowest priority (a sheet discharge bin having the same name registered last) is supposed to be selected.

Next, in step S602 with a judgement of the retrieval result of processing in step S601, in other words, judging whether or not there is a sheet discharge bin having the same name as the discrimination name designated in the printing data, if it is judged that there is a sheet discharge bin having the same name, whether or not the bin is full-stacked is judged based on the sheet discharge bin stacking state (this information is based on the detecting result from the sheet discharge stacking quantity detecting sensor of the bin to which sheets are discharged) stored in the EEPROM 410 shown in FIG. 14 in step S603. Unless the bin is judged to be full-stacked, the temporarily determined bin retrieved in step S601 is determined (selected) as a formal bin in S604, in other words, a numeric value indicating a sheet discharge port selected for the "sheet discharge port" 1111 in the page table is stored before discharging the sheet.

On the other hand, if the sheet discharge bin having the same name as the discrimination name designated in the printing data is judged to be full-stacked in step S603, in step S605 it is checked that a bin having the next lowest priority subsequent to the temporarily determined bin retrieved in step S601 (corresponding to a bin succeeding the temporarily determined bin retrieved in step S601. In discharging sheets sequentially from the uppermost bin to the lower-stage bin among a plurality of bins, the bin located in one lower than the temporarily determined bin is the subsequent bin. On the other hand, in discharging sheets sequentially from the lowermost bin to the upper-stage bin among a plurality of bins, the bin located in one upper than the temporarily determined bin is the subsequent bin. It is predetermined according to a method of setting the priority in the above whether the separation is performed toward the lower-stage bin or toward the upper-stage bin) is vacant on the basis of the sheet discharge bin stored in the EEPROM 410 shown in FIG. 14 or on the shared memory shown in FIG. 15, and unless the bin is judged to be vacant in step S606, the bin is not registered anew, but the temporarily determined bin retrieved in step S601 is determined (selected) as a formal bin in step S604, in other words, a numeric value representing the sheet discharge port selected for the "sheet discharge port" 1111 in the page table 1100 is stored. Then, the control exits this processing and progresses to step S514 shown in FIG. 22. In this case, since the bin is judged to be full-stacked, a negative judgement (NO) is selected in step S514 and then the control progresses to step S516, which causes an interruption in processing such as, for example, recording processing in the image recording apparatus 102 until the abnormal state is removed by a user (for example, until a user removes the recording sheets in the bin determined by a judgement in step S601). Naturally, a sheet discharge operation of the printed sheets to the sheet discharge bin is also halted (inhibited). In other words, at an occurrence of a condition that a recording sheet discharge destination need be changed to another bin for a reason such as a full stacking of a bin during a discharge operation of recording sheets to the bin, if it is judged that the recording sheets cannot be discharged in the current state for a reason such that a bin adjacent (subsequent) to the current bin is full-stacked, the CPU 409 controls the sheet discharge operation of the recording sheets so as to be halted (inhibited) even if any of other bins is confirmed to be vacant as a result of the detection from each sensor in the sheet discharge stacking quantity detecting sensors 271S to 278S so that the recording sheet discharge operation can be continued directly.

The reason why this control is performed is described below. In the user separation automatic mode, the apparatus appropriately checks conditions of the sheet discharge bins in the image recording apparatus while it separates sheets into appropriate bins with judgements of the apparatus in order to perform an appropriate separation according to a purpose of the sheet discharge desired by a user with making the most of the sheet discharge bins while reducing a load on the user to the minimum to improve the operability as described above. In other words, the user makes no settings nor designations on which bin is used to discharge recording sheets among a plurality of bins, and therefore the image recording apparatus automatically determines a bin to which sheets are to be discharged and the user does not decide the sheet discharge destination based on his or her own judgement, by which the user does not know which bin the sheets are to be discharged to at a start of the printing. Therefore, if printed sheets are discharged to a plurality of bins, there is a possibility of causing various types of problems such that recording sheets are forgot to be picked up, that a user cannot grasp where his or her own printed sheets are without checking carefully all of the plurality of bins one by one, or that an order of printing jobs is confused. Accordingly, in this embodiment, taking into consideration these conditions sufficiently, the above control is performed to prevent an occurrence of the various problems as described above and a user is notified of information by which he or she can understand which bin the sheets are discharged to as shown in FIG. 8 together with a printing end notification in order to reliably prevent an occurrence of these problems.

On the other hand, in step S606, if the bin is judged to be vacant having the next lowest priority subsequent to the temporarily determined bin retrieved in step S601, the priority bin subsequent to the temporarily determined bin retrieved in step S601 is determined (selected) to be a formal bin in step S607 and the discrimination name designated in the printing data as a bin name of the bin is registered in the EEPROM 410 shown in FIG. 14. Then, the control exits this processing and progresses to step S514 shown in FIG. 22. In this case, the subsequent bin is not in a full stacking state, but is in a vacant state, which is judged to be no abnormality. Therefore, a positive judgement (YES) is selected in step S514 and the control progresses to step S515 to execute an image forming processing and a recording sheet discharge operation to the bin determined as a judgement in step S608. In other words, if it is judged that a bin adjacent (subsequent) to the current bin (bin in the full stacking state) is vacant so that the recording sheets can be discharged when a sheet discharge destination of the recording sheets need be changed to another bin for a reason for the full stacking of the current bin or any other reasons during a recording sheet discharge operation to a certain bin, the recording sheet discharge operation is permitted to discharge the recording sheet to the bin and the CPU 409 controls the recording sheet discharge operation to continue without change. Accordingly, even if printed sheets are discharged to a plurality of bins, a continuity of his or her own printed sheets are secured so that the above disadvantage is resolved and the user can easily confirm his or her own printed sheets so as to take them out when he or she has come to the image recording apparatus 102 to pick up his or her own printed sheets.

On the other hand, if it is judged that there is no sheet discharge bin having the same name as the discrimination name designated in the printing data in step S602 as a result of the retrieval in step S601, a vacant bin is retrieved from the highest priority bin on the basis of the stacking state of the sheet discharge bins stored in the EEPROM 410 shown in FIG. 14 and on the shared memory shown in FIG. 15 in step S609 and it is judged whether or not there is a vacant bin as a result of the retrieval in step S609; if it is judged that there are vacant bins, the highest bin is determined to be a formal bin among the vacant bins in step S611 and the discrimination name designated in the printing data is registered as a bin name of the bin in the EEPROM 410 shown in FIG. 14 in step S612. Then, the control exits this processing and progresses to step S514 shown in FIG. 22. In this case, a positive judgement (YES) is selected in step S514 and the control progresses to step S515 to execute image forming processing and a recording sheet discharge operation to the bin determined by the judgement in step S612. As this condition, there is a case, for example, in which printed sheets of the job are discharged to no bin and the image formation and discharge operations are to be started now.

On the other hand, if it is judged that there is no vacant bin in step S610 as a result of the retrieval in step S609, another user has already been using all of the bins and there is no bin to be allocated anew, and therefore an escape bin used for discharging in case of an impossible output as designated is determined to be a formal bin before terminating the processing in step S613. In this embodiment, an upper-stage bin is assumed to have a higher priority.

By referring to FIG. 24, processing for updating information of sheet discharge bins is described below.

Figure 24:
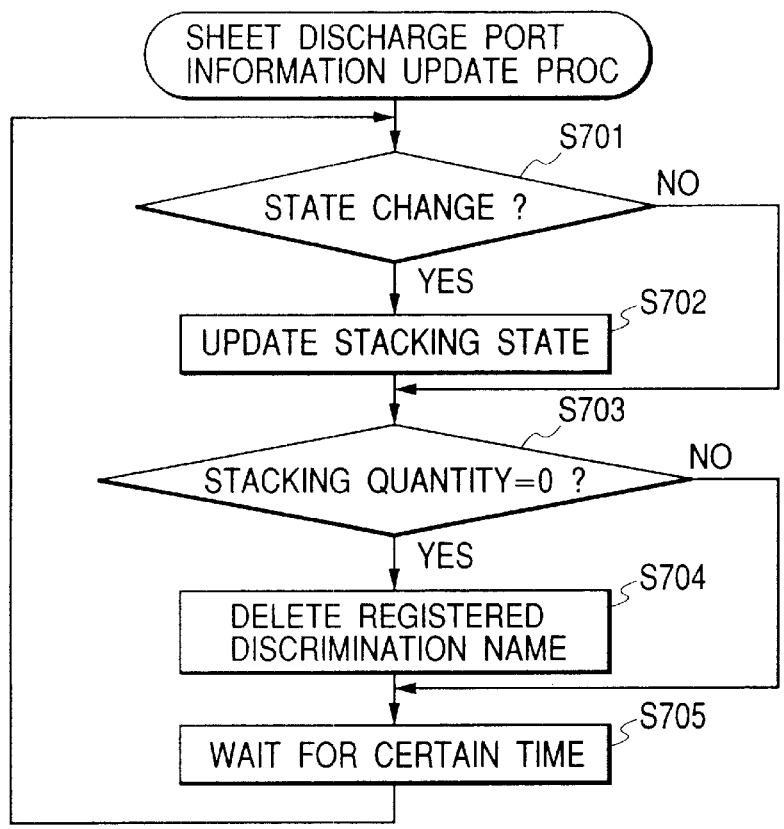
FIG. 24 is a flow chart showing a seventh control processing procedure of an image recording system to which are applicable the data processing apparatus and the image recording apparatus of the present invention.

Referring to FIG. 24, there is shown a flow chart of a seventh control processing procedure of an image recording system to which the data processing apparatus and the image recording apparatus of the present invention are applicable, corresponding to processing for updating information of sheet discharge bins; the CPU 409 shown in FIG. 14 executes the procedure based on programs stored in the ROM 404 or other storage mediums. S701 to S705 indicate steps.

For a state of a sheet discharge port, there is acquired a status information whose state changes at fixed period intervals (status information acquired by accessing the shared memory (FIG. 15) of the option controller unit 106 to exchange a command status with an option) and it is updated (stored in the EEPROM 410 shown in FIG. 14).

First, it is judged whether or not there is any change in stacking quantities (states) of respective sheet discharge bins by referencing the shared memory shown in FIG. 15 in step S701 and if it is judged that there is a change in the stacking quantities of the sheet discharge bins (for example, recording sheets are removed by a user, etc.), the stacking state of the sheet discharge bin stored in the EEPROM 410 shown in FIG. 14 (the stacking state of the sheet discharge bins in which the change is detected) is updated in step S702 and the control progresses to step S703.

On the other hand, if it is judged that there is no change in the stacking quantities of the sheet discharge bins in step S701, the control progresses to step S703 directly.

Next, it is judged whether or not there is any sheet discharge bin whose stacking quantity becomes zero in step S703 and if it is determined that there is a sheet discharge bin whose stacking quantity becomes zero, the CPU deletes the discrimination name of the bin registered in the EEPROM 410 shown in FIG. 14 in the user separation automatic retrieval processing shown in FIG. 23 so as to make a vacant bin in step S704 and then the control progresses to step S705.

On the other hand, if it is determined that there is no sheet discharge bin whose stacking quantity becomes zero in step S703, the control progresses to step S705 directly.

Next, in step S705, the CPU enters a wait state for a certain period of time and repeats the processing in step S701.

With the above processing, the registration or deletion of a sheet discharge bin is dynamically performed on the basis of the name registration state of the sheet discharge bin for printing to achieve a separation by discrimination names.

Detailed descriptions of the following operations will be omitted in this embodiment; retrieval processing in the user separation fixed designation in step S507 in FIG. 22, retrieval processing in the sorting designation in step S509, retrieval processing in the stack designation in step S511, and retrieval processing in the fraudulent designation in step S512. It should be noted that, however, the CPU 409 operates so as to perform controls not based on the controls described by using FIG. 23.

In other words, the CPU 409 controls the processing so as to perform different controls from the series of the following controls in the user separation automatic mode; in other words at an occurrence of a condition that a recording sheet discharge destination needs be changed to another bin for a reason such as a full stacking of a bin during discharging recording sheets to the bin, if it is judged that the recording sheets cannot be discharged in the current state for a reason such that a bin adjacent (subsequent) to the current bin is full-stacked, the CPU 409 controls the sheet discharge operation of the recording sheets so as to be halted (inhibited) even if any of other bins is confirmed to be vacant as a result of the detection from each sensor in the sheet discharge stacking quantity detecting sensors 271S to 278S so that the recording sheet discharge operation can be continued directly, and on the other hand, if it is judged that a bin adjacent (subsequent) to the current bin is vacant so that the recording sheets can be discharged, the recording sheet discharge operation is permitted to discharge the recording sheets to the bin and the CPU controls the recording sheet discharge operation to continue without change. In other words, the series of processing should be executed in the user separation automatic mode and the above series of processing in the user separation automatic mode is inhibited to be performed in a sheet discharge mode other than the user separation automatic mode.

The reason why this control is performed is described below. In the user separation automatic mode, the apparatus appropriately checks conditions of the sheet discharge bins in the image recording apparatus while it dynamically separates sheets into appropriate bins with judgements of the apparatus in order to perform an appropriate separation according to a purpose of the sheet discharge desired by a user with making the most of the sheet discharge bins while reducing a load on the user to the minimum to improve the operability as described above, and therefore the user does not know which bin the sheets are discharged to until the printing is completed. On the other hand, in a sheet discharge mode such as the user separation fixed mode, for example, a user can determine a bin to which recording sheets are to be discharged and causes the image recording apparatus 102 to operate so as to discharge the recording sheets to the bin determined by the user as described above and in this mode the user designates and sets a bin to which recording sheets are to be discharged among a plurality of bins, by which the user previously know to which bin sheets are discharged. Therefore, in discharging printed sheets to a plurality of bins, a user previously knows to which bin recording sheets are discharged and therefore there is no problem even if his own recording sheets are discharged to a plurality of bins not contiguous (for example, bin 2 and bin 5), for example.

Accordingly in this embodiment, in a sheet discharge mode equivalent to a mode in which a user can designate a bin to which recording sheets are to be discharged among a plurality of bins in a plurality of sheet discharge modes, the CPU 409 controls the operations so as to perform controls independent of the controls in the user separation automatic mode in the above (for example, unless the user separation automatic mode is judged to be designated in step S504 shown in FIG. 22, the control progresses to the processing in step S506 to perform controls independently of the operations based on the controls in step S505 such as steps S507, S508 and S511).

By referring to FIG. 25, a description will be given to a processing procedure for updating information and displays indicating a printer state on the host computer 101.

Figure 25:
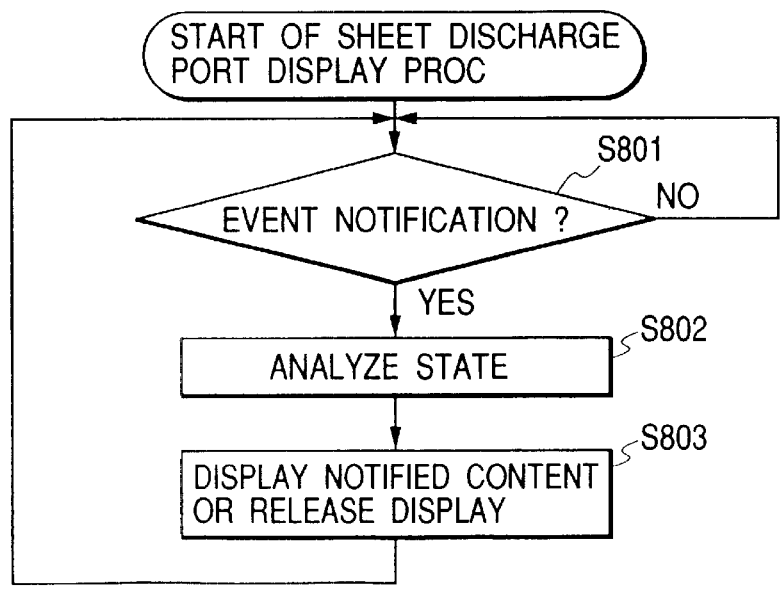
FIG. 25 is a flow chart showing an eighth control processing procedure of an image recording system to which are applicable the data processing apparatus and the image recording apparatus of the present invention.
Figure 27:
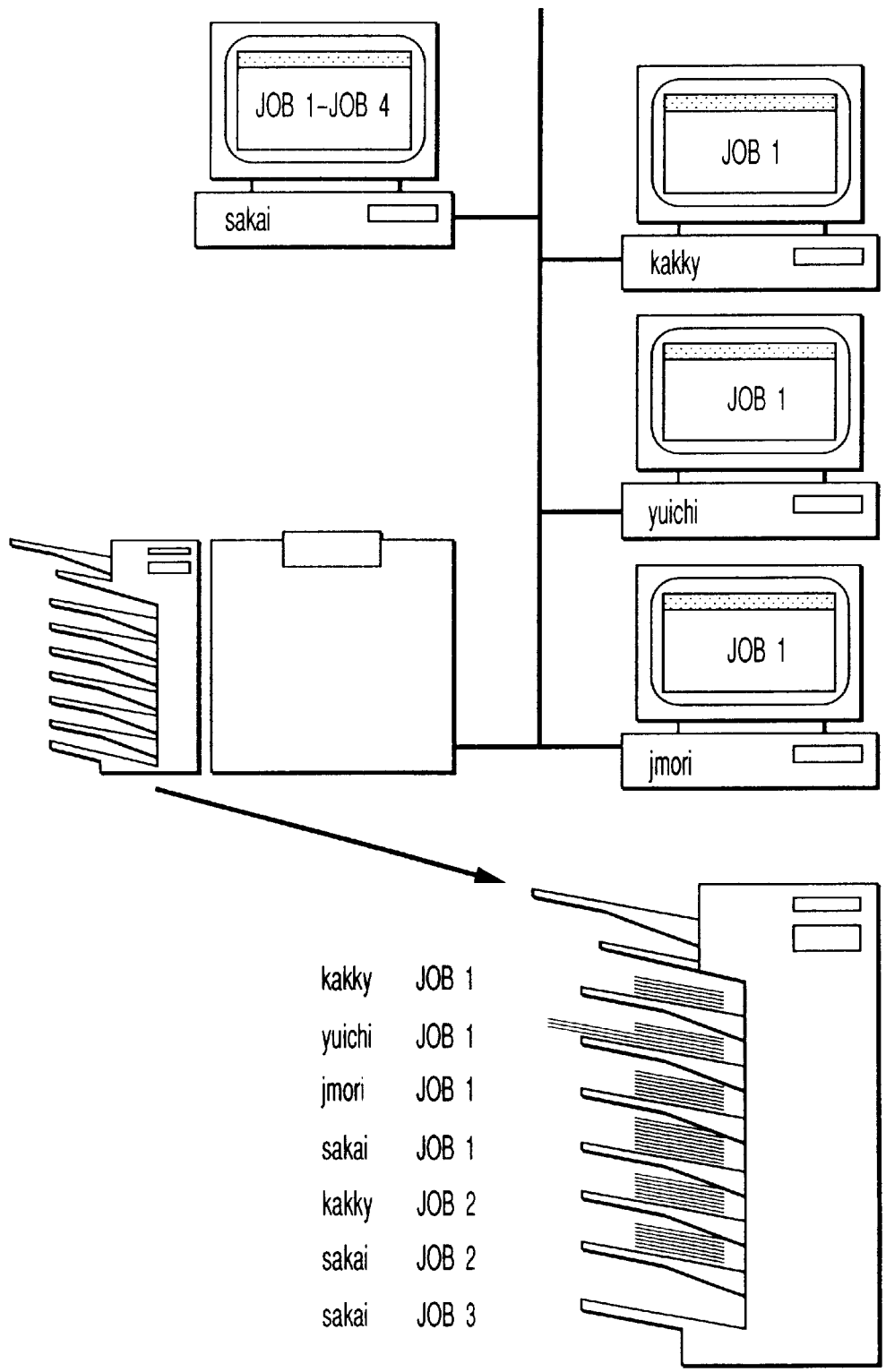
FIG. 27 is a conceptual diagram of assistance in explaining a conventional separation method, a 1-job separation mode (1)
Figure 28:
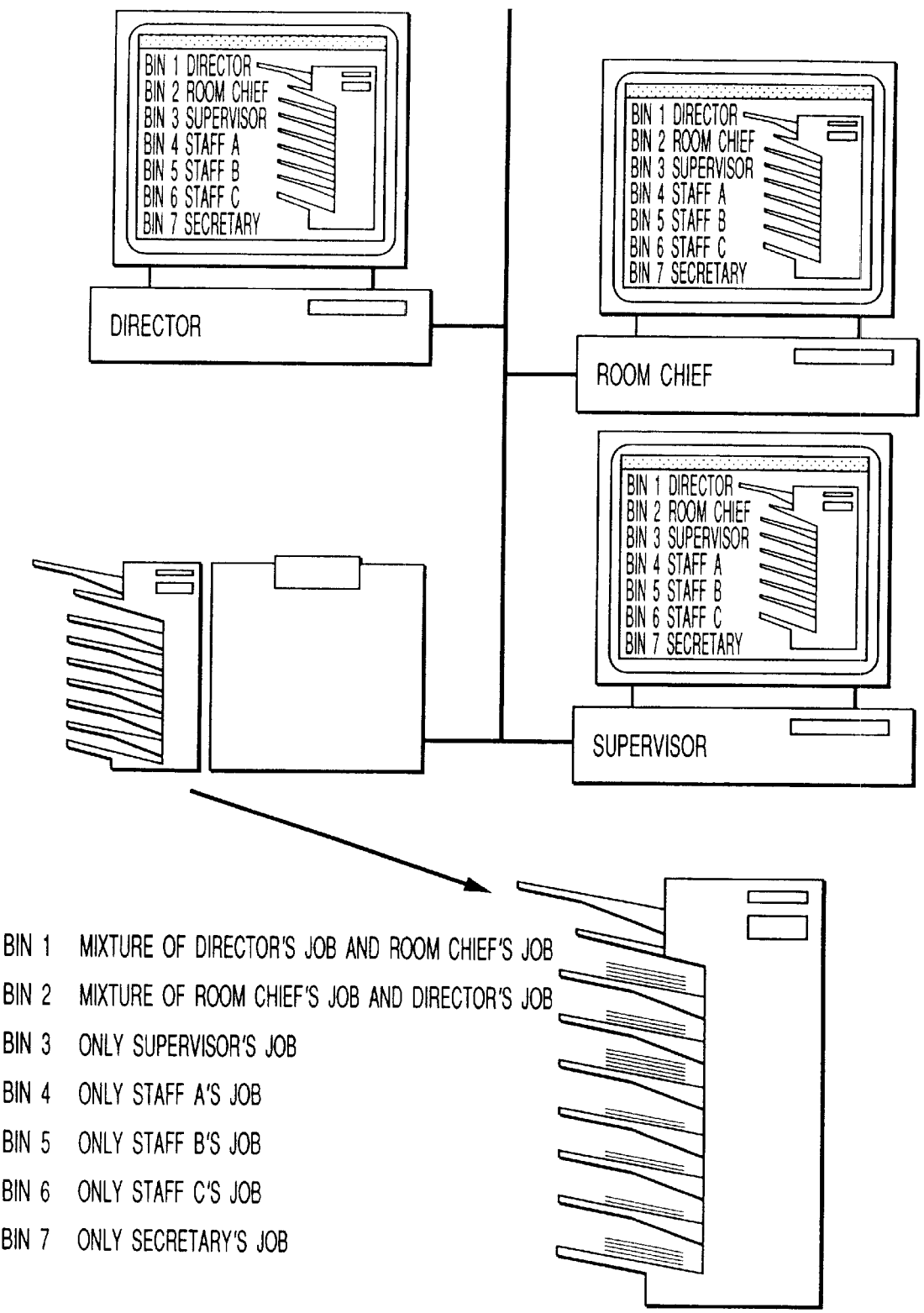
FIG. 28 is a conceptual diagram of assistance in explaining a conventional separation method, a pseudo mailbox mode (2)
Figure 29:
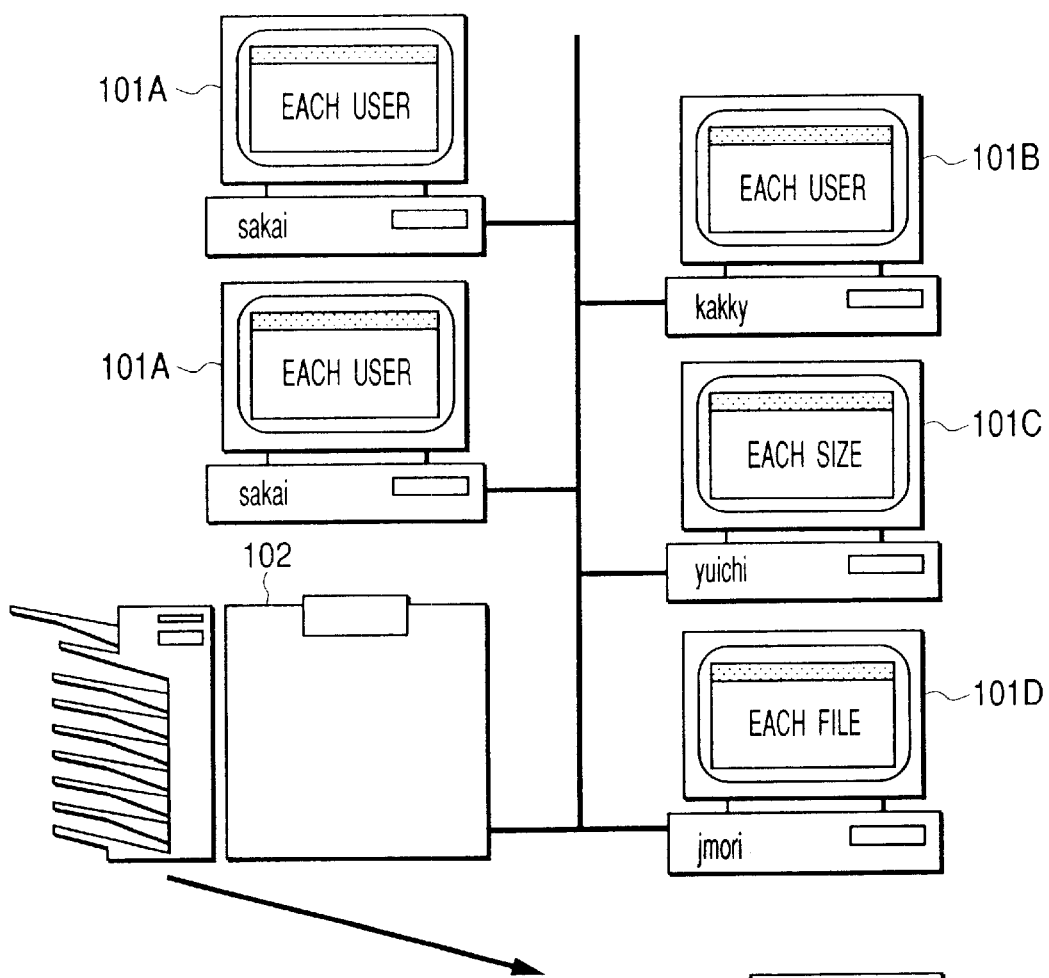
FIG. 29 is a conceptual diagram of assistance in explaining a conventional separation method, a sheet discharge method described in the Japanese Patent Application No. 2-120068 (3)

Referring to FIG. 25, there is shown a flow chart of a eighth control processing procedure of an image recording system to which the data processing apparatus and the image recording apparatus of the present invention are applicable, corresponding to processing of updating information and displays indicating a printer state on the host computer; the CPU 1 of the host computer 101 shown in FIG. 5 executes the procedure based on programs stored in the ROM or other storage mediums. S801 to S803 indicate steps.

In step S801, first, the CPU waits for an event notification (a notification of a bin to which sheets are discharged in step S515 in FIG. 22, a notification of an error display in step S516, a notification of an error display release, etc.); if the printer state changes and an event notification is judged to be issued, the CPU receives the event notification and then analyzes the contents (a notification of a bin to which sheets are discharged, a notification of an error display, a notification of an error display release, etc.) in step S802.

Next, in step S803, the contents of the notification are displayed or the display release is executed on the basis of the contents as the result of the analysis, and a user is informed of the change of the printer state.

For example, in the user separation automatic mode, sheet discharge bins are dynamically allocated and therefore a user does not know to which bin sheets are discharged until the printing is completed. Accordingly, at an end of the printing job, the host computer is notified of the bin information containing a registered discrimination name designated in the job and a message such as, for example, "You use bin 1 to bin 3" or "Bin 2 is used for discharging sheets of A3" is displayed on the CRT 10 shown in FIG. 5 to inform the user of sheet discharge bin information such as a bin using condition (see the screen shown in FIG. 8).

By using FIGS. 30A, 30B, 30C, 30D, 30E and 30F, a description will be given below to concrete examples of the controls of the separation processing in the user separation automatic mode set forth in the above with FIGS. 22, 23, 24 and 25.

Figure 30A:
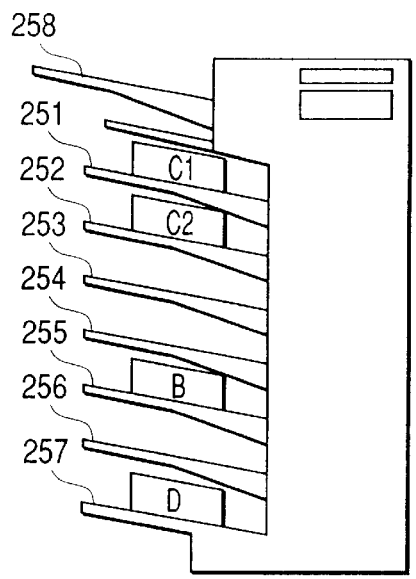
FIGS. 30A, 30B, 30C, 30D, 30E and 30F are diagrams of assistance in explaining concrete examples of processing in a user separation automatic mode of this embodiment.

Referring to FIG. 30A, printed sheets of a user C are assumed to be already stacked on both of a first sheet discharge bin 251 and a second sheet discharge bin 252, printed sheets of a user B are on a fifth sheet discharge bin 255, and printed sheets of a user D are on a seventh sheet discharge bin 257, and other bins are assumed to be vacant. In this condition, it is supposed that a user A having the host computer 101A designates the user separation automatic mode and outputs printing data to the image recording apparatus 102. In addition, the above-described priority is assumed to be preset so that the separation processing is performed from an upper-stage bin to a lower-stage bin.

Figure 30B:
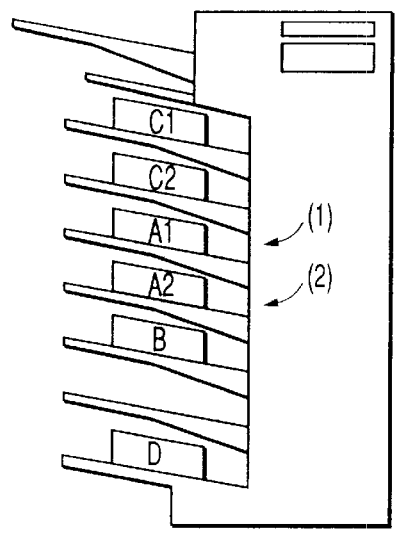

In this condition, by referring to FIG. 30B, a printed sheet A1 of the user A is discharged to a third sheet discharge bin 253 (1), first. Then, it is supposed that sheets are stopped to be discharged to the third sheet discharge bin 253 due to full stacking of the third sheet discharge bin 253 or a completion of discharging sheets by the number of copies. Unless the data output for the printing of the user A is completed at this point, the sheet discharge destination is changed to another bin. In this case, a recording sheet stacking quantity is checked for a bin subsequent to the current bin (the third sheet discharge bin 253), in other words, a fourth sheet discharge bin 254. Then, the fourth sheet discharge bin 254 is currently vacant, and therefore the printed sheets A2 of the user A are discharged to the fourth sheet discharge bin 254 (2). Furthermore, it is supposed that the fourth sheet discharge bin is also full-stacked, but that still the output of the data to be printed of the user A is not completed and that the printed sheets of the user A need be discharged to another bin. In this case, in this embodiment, the recording sheet discharge operation of the user A is intentionally halted since an adjacent bin (subsequent bin) to the currently accessed bin, in other words, a bin subsequent to the fourth sheet discharge bin 254, in other words, a fifth sheet discharge bin 255 is already used for stacking other recording sheets and not vacant, though the printed sheets can be discharged to other vacant bins, a sixth sheet discharge bin 256 or an eighth sheet discharge bin 258. This event is reported to the host computer 101A of the user A via a network. It should be noted that, however, the recording sheet discharge operation is continued directly even unless the subsequent bin (in this case, the fifth sheet discharge bin 255) is vacant since the recording sheets are discharged to predetermined sheet discharge bins in a sheet discharge mode other than the user separation automatic sheet discharge mode such as, for example, the user separation fixed mode.

As set forth in the above, at an occurrence of a condition in which a recording sheet discharge destination need be changed to another bin due to full stacking of the current bin or any other reasons during recording sheet discharge operation to a bin in the user separation automatic mode, if it is judged that the recording sheets cannot be discharged to a bin adjacent to the currently accessed bin (subsequent bin) in the current condition due to full stacking of the subsequent bin, the CPU controls the recording sheet discharge operation so as to be halted even if any of other bins is confirmed to be vacant as a result of the detection from each sensor in the sheet discharge stacking quantity detecting sensors 271S to 278S so that the recording sheet discharge operation can be continued directly, while if it is judged that a bin adjacent (subsequent) to the current bin is vacant so that the recording sheets can be discharged, the recording sheet discharge operation is permitted to discharge the recording sheets to the bin and the CPU controls the recording sheet discharge operation to continue without change.

Figure 30C:
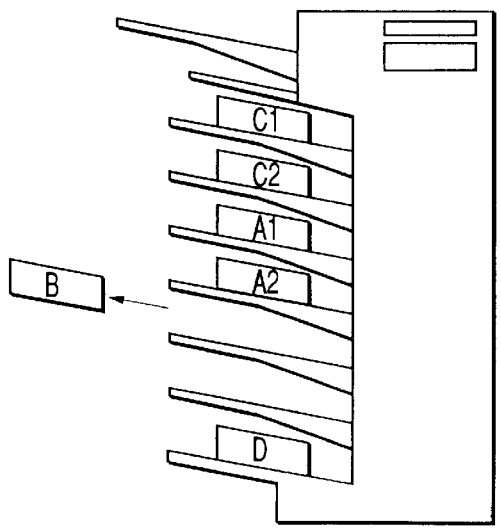
Figure 30D:
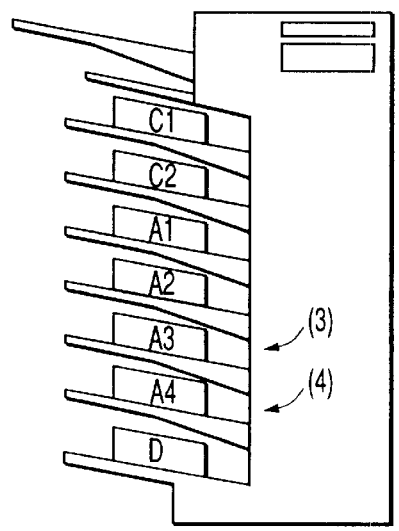

In FIG. 30B, there is a recovery method of the halted sheet discharge operation of the printed sheets of the user A such as, for example, as shown in FIG. 30C the user A who has received an error notification or the user who has received a printing end notification removes the printed sheets B of the user B from the fifth sheet discharge bin 255 and in response to a confirmation of the vacant state of the fifth sheet discharge bin 255 as a result of the detection from a sensor, as shown in FIG. 30D the printed sheets A3 of the user A are discharged to the fifth sheet discharge bin 255 subsequently (3) and unless the output ends yet they are discharged to the sixth sheet discharge bin 256 (4). Accordingly, the printed sheets of the user A discharged to a plurality of bins are discharged to the third sheet discharge bin 253 to the sixth sheet discharge bin 256 so as to keep the continuity.

Figure 30E:
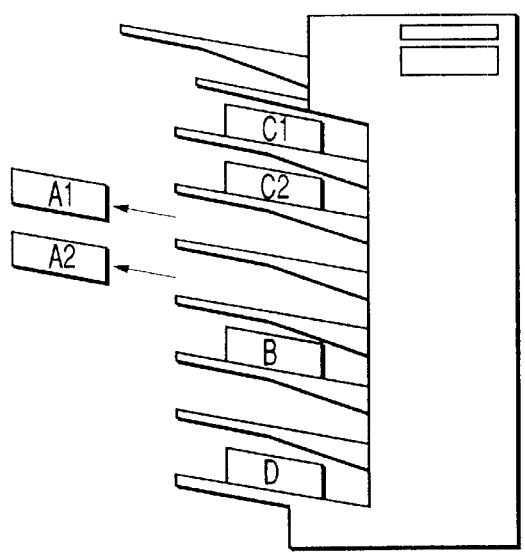
Figure 30F:
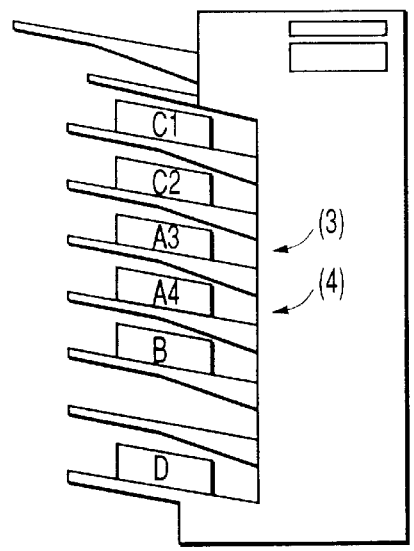

In addition there is another recovery method such as, for example, referring to FIG. 30E a user such as the user A who has received the error notification removes printed sheets A1 and printed sheets A2 of the user A from both of the third sheet discharge bin 253 and the fourth sheet discharge bin 254 and in response to a confirmation of the vacant state of the fifth and sixth sheet discharge bins 255 and 256 as a result of the detection from a sensor, as shown in FIG. 30F the printed sheets A3 of the user A are discharged to the third sheet discharge bin 253 subsequently (3) and unless the output ends yet they are discharged to the fourth sheet discharge bin 254 (4). It should be noted that, however, this method is used for keep the continuity and therefore the CPU controls the recovery operation so as to be inhibited to be performed when printed sheets are removed from only one of the third sheet discharge bin 253 and the fourth sheet discharge bin 254.

[Second Embodiment]

While only the separation for each user, each sheet size, and each file name is described giving these examples in FIG. 1 in the first embodiment in the above, it is also possible to configure the system so as to add information managed on the host computer to the printing data as discrimination names regarding separation for each host computer, each application, and each time period in the same manner. Embodiments for these are described below.

The separation can be realized by adding the following information to the printing data; a host ID for each host computer, an application name (identifier), for example, for each application, and information up to an end of a time unit, for example, so that a discrimination name changes in units of an hour for each time period.

Accordingly, printing results can be separated for each host computer, each application, and each time period.

[Third Embodiment]

While there is no description of where an escape bin is installed for a use of discharging sheets when sheets cannot be discharged as designated in step S613 shown in FIG. 23 in the above first embodiment, it is possible to preset places of the escape bin by a panel setting of the printer or a setting from the host computer so that a user can select the place.

[Fourth Embodiment]

While information reported to the host computer at an end of a job is a bin having a registered discrimination name designated in the printing job such as, for example, "You use bin 1 to bin 3" in the above first embodiment, there are some cases in which a bin name is not registered like a sheet discharge to an escape bin and therefore it is possible to return information of bins to which the job has been actually discharged rather than returning transmitted information of bins used by a user, such as, for example, "Your job is delivered to bin 3" or "No vacancy of bins. Your job is delivered to the escape bin".

[Fifth Embodiment]

While "separation from an upper-stage bin to a lower-stage bin" is described for a condition in which the upper-stage bin has a higher priority in the above first embodiment, it is possible to perform "separation from a lower-stage bin to a upper-stage bin" for a condition in which the lower-stage bin has a higher priority.

In this configuration, if a plurality of bins are used in the user separation automatic mode, sheets are discharged in the same manner as for a stacking discharge, by which sheets stacked in a correct order can be obtained only by taking the stacked sheets out of the bins.

Accordingly, the discrimination name which can be registered and selected and the changeable separation method in sharing the printer make full use of the stacking capability of the sheet discharge ports in separating sheets of a printing job.

In addition, only by selecting a sheet discharge mode at printing without complicated settings on the host computers or the printer, a separation sheet discharge of a printing job can be performed.

Furthermore, by registering and selecting discrimination name on the host computers, not only separation for each user, but also various types of separation adapted to purposes can be achieved for each user.

Still further, an identical name is permitted to be registered for a plurality of sheet discharge ports, by which a single printer can be shared by a larger number of users and a large-capacity sheet discharging can be realized in sharing the printer.

Furthermore, only continuous sheet discharge ports are permitted to be registered with the same name, by which user can easily grasp the sheet discharge order of the printing job sheets stacked on a plurality of sheet discharge ports.

By referring to a memory map shown in FIG. 26, there is provided a description below on a constitution of a data processing program readable by an image recording system to which the data processing apparatus and the image recording apparatus of the present invention are applicable.

Referring to FIG. 26, there is shown a diagram of assistance in explaining a memory map of a storage medium for storing various data processing program readable by the image recording system to which the data processing apparatus and the image recording apparatus of the present invention are applicable.

In this storage medium, other information may be stored; information for managing program groups stored in the storage medium, for example, version information, generators, or the like and information dependent on the OS or the like in the program readout section, for example, icons for discriminating and displaying programs.

In addition, data belonging to various programs is also managed in the above directory. If a program or data to be installed is compressed, decompression programs may be stored.

The functions shown in FIGS. 6, 7, 16A and 16B, 17, 22, 23, 24 and 25 in this embodiment can be carried out by a host computer by using programs externally installed. If so, the present invention is also applicable to a case in which an information group including a program is supplied to an output device from a storage medium such as a CD-ROM, a flash memory, or FD or from an external storage medium via a network.

As set forth in the above, apparently the purpose of the present invention is also achieved by supplying a storage medium containing a record of software program codes for realizing the functions of the above embodiments to a system or an apparatus so as to read out and execute the program codes stored in the storage medium with the system or the computer (or a CPU or MPU).

In this condition, the program codes read out from the storage medium realize the new functions of the present invention, and therefore the storage medium storing the program codes is a component of the present invention.

As a storage medium for supplying the program codes, it is possible to use a floppy disk, a hard disk, an optical disk, an optical magnetic disk, a CD-ROM, a CD-R, a magnetic tape, a nonvolatile memory card, a ROM, an EEPROM, or a silicon disk, for example.

In addition, it is apparent that the present invention is also applicable to not only a case in which the functions in the above embodiments are realized by executing the program codes read out by the computer, but also a case in which the functions in the above embodiments are realized by actual processing partially or entirely executed by the OS (operating system) running in the computer on the basis of instructions of the program codes.

Furthermore, apparently the present invention is also applicable to a case in which the functions in the above embodiments are realized by writing program codes read out from the storage medium into a memory included in a feature expansion board inserted into the computer or in a feature expansion unit connected to the computer and then executing actual processing partially or entirely by using a CPU or the like included in the feature expansion board or the feature expansion unit on the basis of instructions of the program codes.

In addition, the present invention is applicable to a system comprising a plurality of devices and to an apparatus comprising a single device. Apparently the present invention is also applicable to a case in which the functions are realized by supplying a program to a system or an apparatus. In this case, by reading out contents of a storage medium storing the program represented by software for achieving the present invention to the system or the apparatus, the system or the apparatus can take advantage of effects of the present invention.

Furthermore, by downloading and reading out the program represented by software for achieving the present invention from a database on a network by using a communication program, the system or the apparatus can take advantage of the effects of the present invention.

As set forth hereinabove, according to this embodiment, with making full use of the stacking capability of the sheet discharge ports without complicated settings for each data processing apparatus, various kinds of printed sheets can be separated and discharged according not only to a user name, but to various purposes of discharging sheets (separation for each host name, separation for each group name, separation for each post name, separation for each file name, separation for each sheet type, separation for each date, etc.) for each user so as to cope with various requests from users and it is also possible to prevent disadvantages which may be caused by utilizing the stacking capability of the sheet discharge ports (for example, disadvantages which may occur if printed sheets are discharged to a plurality of bins, such that recording sheets are forgot to be picked up, that a user cannot grasp where his or her own printed sheets are discharged without checking carefully all of the plurality of bins one by one, or that an order of printing jobs is confused).

What is claimed is:

1. An image forming apparatus connectable to a sheet processing apparatus, which includes a plurality of stacking units for stacking recording sheets, said image forming apparatus being capable of selectively discharging recording sheets to the plurality of stacking units, said image forming apparatus comprising:

control means for controlling a discharge operation of remaining recording sheets of a job if a selected stacking unit, of the plurality of stacking units, becomes nonusable by the recording sheets of the job during the discharge operation of the job, wherein said control means permits the discharge operation of the remaining recording sheets to an adjacent stacking unit which is adjacent to the selected stacking unit of the plurality of stacking units, if the adjacent stacking unit is usable, even if recording sheets have been stacked in another stacking unit which is different from both of the selected stacking unit and the adjacent stacking unit of the plurality of stacking units, when it is not the condition that the adjacent stacking unit is nonusable by other recording sheets which are different from the recording sheets of the job, and wherein said control means inhibits the discharge operation of the remaining recording sheets, even if recording sheets have not been stacked in the another stacking unit, when it is the condition that the adjacent stacking unit is nonusable by the other recording sheets, even if other stacking units which are nonadjacent to the selected stacking unit of the plurality of stacking units are usable.

2. An image forming apparatus according to claim 1, wherein said image forming apparatus records printing data from a remote data processing apparatus onto the recording sheets.

3. An image forming apparatus according to claim 2, wherein said image forming apparatus selects a stacking unit to which the recording sheets having printing data recorded thereon are discharged on the basis of a sheet discharge mode selected by a user of the data processing apparatus and output from the data processing apparatus.

4. An image forming apparatus according to claim 3, wherein the sheet discharge mode is selected from a first mode in which a stacking unit to which recording sheets are discharged is automatically determined by said image forming apparatus and a second mode in which a stacking unit to which recording sheets are discharged is designated by a user of the data processing apparatus.

5. An image forming apparatus according to claim 4, wherein said control means executes a control for selectively permitting and inhibiting the discharge operation of the remaining recording sheets, when the user selects the first mode, and inhibits the control for controlling the permitting and inhibiting the discharge operation of the remaining recording sheets when the user selects the second mode.

6. An image forming apparatus according to claim 4, further comprising notification means for notifying the data processing apparatus of first information indicating an end of output processing of the job in response to the end of output processing of the job.

7. An image forming apparatus according to claim 6, wherein, when the user selects the first mode, said notification means notifies the data processing apparatus of second information, by which the user can discriminate to which stacking unit of said plurality of stacking units the recording sheets have been discharged.

8. An image forming apparatus according to claim 1, wherein in an inhibited sheet discharge operation of the remaining recording sheets, said control means releases the discharge operation of the remaining recording sheets from an inhibition state and executes the discharge operation of the remaining recording sheets to the adjacent stacking unit in response to a confirmation of a removal of the recording sheets from the adjacent stacking unit.

9. An image forming apparatus according to claim 1, wherein in an inhibited discharge operation of the remaining recording sheets, said control means releases the discharge operation of the remaining recording sheets from the inhibition state and executes the discharge operation of the remaining recording sheets to the adjacent stacking unit from which the recording sheets of the job have been removed in response to a confirmation of a removal of the recording sheets of the job from the nonusable, selected stacking unit.

10. An image forming apparatus according to claim 1, wherein in an inhibited discharge operation of the remaining recording sheets, said control means releases the discharge operation of the remaining recording sheets from the inhibition state in response to one of a confirmation of a removal of the recording sheets from the adjacent stacking unit and a confirmation of a removal of the remaining recording sheets from the selected stacking unit.

11. An image forming apparatus according to claim 1, wherein a stacking unit becomes nonusable upon becoming full of the recording sheets.

12. An image forming apparatus according to claim 1, wherein a stacking unit becomes nonusable upon discharge of the last of the recording sheets of the job.

13. An image forming apparatus according to claim 1, wherein the adjacent stacking unit is a stacking unit, which is one stage lower than the selected stacking unit.

14. An image forming apparatus according to claim 1, wherein the adjacent stacking unit is a stacking unit, which is one stage higher than the selected stacking unit.

15. A control method for an image forming apparatus which is connectable to a sheet processing apparatus having a plurality of stacking units for stacking recording sheets, said control method being capable of selectively discharging the recording sheets to the plurality of stacking units, said control method comprising:

a control step of controlling a discharge operation of remaining recording sheets of a job, if a selected stacking unit becomes nonusable during a discharge operation of the job, wherein said control step permits the discharge operation of the remaining recording sheets to an adjacent stacking unit which is adjacent to the selected stacking unit, without an instruction for designating a stacking unit from a user of the job, even if recording sheets have been stacked in another stacking unit which is different from both of the selected stacking unit and the adjacent stacking unit of the plurality of stacking units, when it is not the condition that the adjacent stacking unit is nonusable by other recording sheets which are different from the recording sheets of the job.

16. A control method for an image forming apparatus which is connectable to a sheet processing apparatus having a plurality of stacking units for stacking recording sheets, said control method being capable of selectively discharging the recording sheets to the plurality of stacking units, said control method comprising:

a control step of controlling a discharge operation of remaining recording sheets of a job, if a selected stacking unit becomes nonusable during a discharge operation of the job, wherein said control step inhibits the discharge operation of the remaining recording sheets to another stacking unit of the plurality of stacking units, said another stacking unit is different from both of the selected stacking unit and an adjacent stacking unit which is adjacent to the selected stacking unit, even if said another stacking unit is usable, when the adjacent stacking unit is not usable by other recording sheets which are different from the recording sheets of the job.

17. A control method for an image forming apparatus which is connectable to a sheet processing apparatus having a plurality of stacking units for stacking recording sheets, said control method being capable of selectively discharging the recording sheets to the plurality of stacking units, said control method comprising:

a control step of controlling a discharge operation of remaining recording sheets of a job, if a selected stacking unit becomes nonusable during a discharge operation of the job, wherein said control step permits the discharge operation of the remaining recording sheets to an adjacent stacking unit which is adjacent to the selected stacking unit of the plurality of stacking units, and wherein said control step inhibits the discharge operation of the remaining recording sheets to another stacking unit of the plurality of stacking units, said another stacking unit is different from both of the selected stacking unit and the adjacent stacking unit, even if the another stacking unit is usable, when it is not the condition that the adjacent stacking unit is nonusable by other recording sheets which are different from the recording sheets of the job.

18. A control method for an image forming apparatus, which is connectable to a sheet processing apparatus having a plurality of stacking units for stacking recording sheets, said control method being capable of selectively discharging the recording sheets to the plurality of stacking units, said control method comprising:

a control step of controlling a discharge operation so as to permit a distribution discharge operation of recording sheets included in a job to at least two stacking units of the plurality of stacking units, when a continuity of the recording sheets included in the job can be maintained, if all of the recording sheets included in the job cannot be discharged to one stacking unit of the plurality of stacking units, and controlling the discharge operation so as to inhibit the distribution discharge operation of the recording sheets included in the job to the at least two stacking units, when the continuity of the recording sheets included in the job cannot be maintained, even if a usable stacking unit is available among the plurality of stacking units, if all of the recording sheets included in the job cannot be discharged to the one stacking unit.

19. An image forming apparatus, which is connectable to a sheet processing apparatus having a plurality of stacking units for stacking recording sheets, said image forming apparatus being capable of selectively discharging the recording sheets to the plurality of stacking units, said image forming apparatus comprising:

control means for controlling a discharge operation of remaining recording sheets of a job, if a selected stacking unit becomes nonusable during a discharge operation of the job, wherein said control means permits the discharge operation of the remaining recording sheets to an adjacent stacking unit which is adjacent to the selected stacking unit, which is adjacent to the selected stacking unit, without an instruction for designating a stacking unit from a user of the job, even if recording sheets have been stacked in another stacking unit which is different from both of the selected stacking unit and the adjacent stacking unit of the plurality of stacking units, when it is not the condition that the adjacent stacking unit is nonusable by other recording sheets which are different from the recording sheets of the job.

20. An image forming apparatus, which is connectable to a sheet processing apparatus having a plurality of stacking units for stacking recording sheets, said image forming apparatus being capable of selectively discharging the recording sheets to the plurality of stacking units, said image forming apparatus comprising:

control means for controlling a discharge operation of remaining recording sheets of a job, if a selected stacking unit becomes nonusable during a discharge operation of the job, wherein said control means inhibits the discharge operation of the remaining recording sheets to another stacking unit of the plurality of stacking units, said another stacking unit is different from both of the selected stacking unit and an adjacent stacking unit of the plurality of stacking units which is adjacent to the selected stacking unit, even if said another stacking unit is usable, when the adjacent stacking unit is not usable by other recording sheets which are different from the recording sheets of the job.

21. An image forming apparatus, which is connectable to a sheet processing apparatus having a plurality of stacking units for stacking recording sheets, said image forming apparatus being capable of selectively discharging the recording sheets to the plurality of stacking units, said image forming apparatus comprising:

control means for controlling a discharge operation of remaining recording sheets of a job, if a selected stacking unit becomes nonusable during a discharge operation of the job, wherein said control means permits the discharge operation of the remaining recording sheets to an adjacent stacking unit which is adjacent to the selected stacking unit of the plurality of stacking units, and wherein said control means inhibits the discharge operation of the remaining recording sheets to another stacking unit of the plurality of stacking units, said another stacking unit is different from both of the selected stacking unit and the adjacent stacking unit, even if said another stacking unit is usable, when it is not the condition that the adjacent stacking unit is nonusable by other recording sheets which are different from the recording sheets of the job.

22. An image forming apparatus, which is connectable to a sheet processing apparatus having a plurality of stacking units for stacking recording sheets and being capable of selectively discharging the recording sheets to the plurality of stacking units, said image forming apparatus comprising:

a control means for controlling a discharge operation so as to permit a distribution discharge operation of the recording sheets included in a job to at least two stacking units of the plurality of stacking units, when a continuity of the recording sheets included in the job can be maintained, if all of the recording sheets included in the job cannot be discharged to one stacking unit of the plurality of stacking units, and controlling the discharge operation so as to inhibit the distribution discharge operation of the recording sheets included in the job to the at least two stacking units, when the continuity of the recording sheets included in the job cannot be maintained, even if a usable stacking unit is available among the plurality of stacking units, if all of the recording sheets included in the job cannot be discharged to the one stacking unit.

23. A control method for an image forming apparatus connectable to a sheet processing apparatus having a plurality of stacking units for stacking recording sheets, said control method being capable of selectively discharging the recording sheets to the plurality of stacking units, said control method comprising:

a control step of controlling a discharge operation of remaining recording sheets of a job if a selected stacking unit becomes nonusable by the recording sheets of the job during a discharge operation of the job, wherein said control step permits the discharge operation of the remaining recording sheets to an adjacent stacking unit which is adjacent to the selected stacking unit of the plurality of stacking units, even if recording sheets have been stacked in another stacking unit which is different from both of the selected stacking unit and the adjacent stacking unit of the plurality of stacking units, when it is not the condition that the adjacent stacking unit is nonusable by other recording sheets which are different from the recording sheets of the job, and wherein said control step inhibits the discharge operation of the remaining recording sheets, even if recording sheets have not been stacked in the another stacking unit, when it is the condition that the adjacent stacking unit is nonusable by the other recording sheets.

24. A storage medium storing code, which is readable by a programmed computer so as to cause an image forming apparatus, which is connectable to a sheet processing apparatus having a plurality of stacking units for stacking recording sheets, said code being capable of selectively discharging the recording sheets to the plurality of stacking units, said code being executable to perform:

a control step of controlling a discharge operation of remaining recording sheets of a job if a selected stacking unit becomes nonusable by the recording sheets of the job during a discharge operation of the job, wherein said control step permits the discharge operation of the remaining recording sheets to an adjacent stacking unit which is adjacent to the selected stacking unit of the plurality of stacking units, even if recording sheets have been stacked in another stacking unit which is different from both of the, selected stacking unit and the adjacent stacking unit of the plurality of stacking units, when it is not the condition that the adjacent stacking unit is nonusable by other recording sheets, which are different from the recording sheets of the job, and wherein said control step inhibits the discharge operation of the remaining recording sheets, even if the recording sheets have not been stacked in the another stacking unit, when it is the condition that the adjacent stacking unit is nonusable by the other recording sheets.

* * * * *

UNITED STATES PATENT AND TRADEMARK OFFICE
CERTIFICATE OF CORRECTION

PATENT NO. : 6,594,545 B1
DATED : July 15, 2003
INVENTOR(S) : Nobuyoshi Kakigi

It is certified that error appears in the above-identified patent and that said Letters Patent is hereby corrected as shown below:

<u>Column 7,</u>
Line 40, "whether" should read -- either --.

<u>Column 9,</u>
Line 23, "bin1" should read -- bin 1 --.

<u>Column 12,</u>
Line 25, "is stored" should read -- are stored --.

<u>Column 15,</u>
Line 23, "¶A" should read -- A --; and
Line 36, "heights" should read -- height --.

<u>Column 17,</u>
Line 57, "signals;" should read -- signals: --.

<u>Column 19,</u>
Line 16, "state;" should read -- state: --.

<u>Column 20,</u>
Line 40, "accesses to" should read -- accesses --.

<u>Column 21,</u>
Line 24, "comprise" should read -- be comprised --; and
Line 26, "named" should read -- named in --.

<u>Column 22,</u>
Line 12, "numeric" should read -- numeric representation --;
Line 15, "numeric" should read -- numeric representation -- and "In" should be deleted;
Line 16, "an" should read -- An --; and
Line 17, "numeric" should read -- numeric representation --.

<u>Column 23,</u>
Line 45, "an" should read -- and --.

<u>Column 24,</u>
Line 24, "form" should read -- from --.

UNITED STATES PATENT AND TRADEMARK OFFICE
CERTIFICATE OF CORRECTION

PATENT NO. : 6,594,545 B1
DATED : July 15, 2003
INVENTOR(S) : Nobuyoshi Kakigi

It is certified that error appears in the above-identified patent and that said Letters Patent is hereby corrected as shown below:

Column 29,
Line 55, "know" should read -- knows --;
Line 61, "example." should read -- example. Accordingly, --; and
Line 62, "¶Accordingly," should read -- Accordingly, --.

Column 30,
Line 10, "of a" should read -- of an --.

Column 32,
Line 6, "keep" should read -- keeping --;
Line 21, "data;" should read -- data: --; and
Line 52, "a upper-stage" should read -- an upper-stage --.

Column 33,
Line 20, "program" should read -- programs --; and
Line 24, "stored;" should read -- stored: --.

Column 40,
Line 8, "the," should read -- the --; and
Line 11, "sheets," should read -- sheets --.

Signed and Sealed this

Tenth Day of February, 2004

JON W. DUDAS
*Acting Director of the United States Patent and Trademark Office*